(12) United States Patent
Green et al.

(10) Patent No.: US 6,783,064 B1
(45) Date of Patent: Aug. 31, 2004

(54) AUTOMATED TRANSACTION SYSTEM AND METHOD

(75) Inventors: Patrick C. Green, North Canton, OH (US); Mark Smith, North Canton, OH (US); Natarajan Ramachandran, Uniontown, OH (US); Daniel J. Delaney, Canton, OH (US); David A. Barker, North Canton, OH (US); Franklin M. Theriault, Canton, OH (US); Elizabeth Herrera, North Canton, OH (US); Jeffrey A. Hill, Canton, OH (US); Mark Douglass, North Canton, OH (US)

(73) Assignee: Diebold, Incorporated, North Canton, OH (US)

( * ) Notice: Subject to any disclaimer, the term of this patent is extended or adjusted under 35 U.S.C. 154(b) by 127 days.

(21) Appl. No.: 10/230,581

(22) Filed: Aug. 29, 2002

Related U.S. Application Data

(62) Division of application No. 09/725,650, filed on Nov. 29, 2000, now Pat. No. 6,443,359.
(60) Provisional application No. 60/168,882, filed on Dec. 3, 1999.

(51) Int. Cl.$^7$ .............................................. G06F 17/60
(52) U.S. Cl. ........................... 235/379; 235/375; 902/8; 902/30; 705/43; 705/35
(58) Field of Search ................................. 235/375, 379, 235/385; 902/8, 30, 9; 705/35, 43; 700/213, 228

(56) References Cited

U.S. PATENT DOCUMENTS

| | | | |
|---|---|---|---|
| 4,733,765 A | | 3/1988 | Watanabe |
| 4,820,909 A | * | 4/1989 | Kawauchi et al. .......... 235/379 |
| 4,988,849 A | * | 1/1991 | Sasaki et al. ............... 235/379 |
| 5,019,249 A | * | 5/1991 | Sugai et al. ................ 209/534 |
| 5,183,999 A | | 2/1993 | Hakeneworth et al. |
| 5,218,912 A | * | 6/1993 | Buske ......................... 108/26 |
| 5,250,788 A | * | 10/1993 | Sugai et al. ................ 235/379 |
| 5,326,179 A | * | 7/1994 | Fukai et al. ................ 400/521 |
| 5,526,615 A | | 6/1996 | Kaizu et al. |
| 5,600,114 A | | 2/1997 | Dunlap et al. |
| 5,645,564 A | * | 7/1997 | Northrup et al. ........... 606/205 |
| 5,719,383 A | * | 2/1998 | Forrest ....................... 235/379 |
| 5,804,804 A | | 9/1998 | Fukatsu et al. |
| 5,941,522 A | * | 8/1999 | Hagstrom et al. .......... 271/225 |
| 6,036,089 A | | 3/2000 | Oguchi et al. |
| 6,206,284 B1 | | 3/2001 | Do et al. |

FOREIGN PATENT DOCUMENTS

| | | | | |
|---|---|---|---|---|
| EP | 0827066 A2 | | 4/1998 | |
| EP | 0843291 A2 | | 5/1998 | |
| JP | 363265378 | * | 11/1988 | ................ 235/483 |
| JP | 11-222327 A | | 8/1999 | |

* cited by examiner

*Primary Examiner*—Thien M. Le
*Assistant Examiner*—Seung H Lee
(74) *Attorney, Agent, or Firm*—Ralph E. Jocke; Daniel D. Wasil; Walker & Jocke

(57) ABSTRACT

An automated transaction system includes an automated transaction machine (10) for carrying out banking transactions. The machine includes a plurality of customer stations (16, 18, 20) at which customers may conduct transactions. Each of the transactions requested by customers is carried out using a set of transaction function devices (34) positioned within or adjacent to the machine housing. The robotic item handling device (42) is included among the transaction function devices and enables moving items between the customer stations and the transaction function devices included in the machine. The machine is enabled to carry out transactions for multiple users simultaneously. The machine is also readily configured to add and delete transaction function devices, thereby more readily changing the types of transactions which may be conducted.

20 Claims, 26 Drawing Sheets

AUTOMATED TRANSACTION SYSTEM AND METHOD

CROSS REFERENCE TO RELATED APPLICATIONS

This application is a divisional of application Ser No. 09/725,650 filed Nov. 29, 2000 now U.S. Pat. No. 6,443,359, which claims benefit of provisional application serial No. 60/168,882 filed Dec. 3, 1999 the disclosures of each of which are incorporated herein by reference.

TECHNICAL FIELD

This invention relates to a system for carrying out transactions. Specifically this invention relates to an apparatus and system which enable carrying out transactions on an automated basis. The transactions may relate to banking, gaming, ticketing, bill payment, pharmacy, postal or other transactions or services.

BACKGROUND ART

Automated banking machines are known in the prior art. A common type of automated banking machine is an automated teller machine ("ATM"). ATMs have been developed which are capable of performing a variety of transactions. Such transactions may include dispensing currency or accepting deposits from a user. Other types of transactions include providing tickets, travelers checks, vouchers or gaming materials. Other types of automated transaction machines enable check cashing, bill payment, printing account statements, dispensing postage and receiving or providing other items of value. Other types of automated banking machines may be operated by a service provider such as a cashier or bank teller. Such automated banking machines may include bill counters, check acceptors, passbook printers and other types of devices. Automated banking machines generally carry out transactions while causing appropriate charges and credits to be applied to the respective accounts of a user, a machine owner and/or a provider of value, such as cash, goods or services, which are effectively transferred through operation of the machine. For purposes of this disclosure, an automated banking machine will be considered to refer to any machine capable of carrying out transactions which involve transfers of value.

Most automated banking machines are limited to being used by only one user at a time. For example when one user operates most ATMs, others are required to form a queue and wait until it is their turn to use the ATM. This may pose an inconvenience for both customers and the ATM operator.

To serve plural customers simultaneously a number of ATMs may be installed at a given facility. However, such additional ATMs take up more physical space. Physical space may be at a premium in some facilities. Providing additional machines may also be expensive. Significant additional costs may be incurred both in acquiring and servicing machines to assure that they are operating properly. When numerous machines are installed at one location, each includes components which are generally duplicative of components in the other machines. In addition, when one machine is upgraded or improved it is usually advisable to apply the same upgrade or improvement to all of the machines. This may add further cost and complexity for the owner of the machines.

A further limitation of most existing ATMs is the limited variety of transactions which may be performed at a single machine. Each machine enclosure is of limited size and may only accommodate a range of transaction function devices that can be fit within the enclosure. It may be desirable in some instances to add additional capabilities to an ATM machine. However, the space required to include the transaction function devices necessary to carry out a new type of transaction may not be available within the machine enclosure unless other transaction function devices are removed. As a result, it is sometimes not feasible to add a transaction function that would be desirable.

At present when additional transaction functions are incorporated into ATMs, it is often necessary to provide larger enclosures. Such larger enclosures are not only necessary to house the devices but to also provide the necessary interfaces for delivering or receiving items from the customer. It is common for each added transaction function device such as dispensers for tickets, receipts, coupons and the like, to have a separate delivery opening in the user interface. Likewise, when a user is enabled to deposit several types of items in the machine it is common to have a separate opening or access mechanism to receive each type of item from the user. Providing these capabilities further adds to the size and complexity of the machine.

In some instances it may be desirable to add the capability to an automated banking machine to communicate with and/or exchange items with a human service provider. Such activities may be desirable for particular types of transactions that cannot be carried out on an automated basis. However, such capabilities may be difficult to add to existing machines not originally built to include such capabilities. Automated transaction machines such as medication dispensers may also benefit from being able to communicate with a human service provider. In such machines it may also be desirable to include a larger range of medications which can be provided to authorized users. Other types of transactions which involve the dispense or receipt of items are commonly not carried out with automated transaction machines because of space requirements of associated dispensing and receiving mechanisms.

Thus there may exist a need for an automated banking machine apparatus and system that may be capable of carrying out more types of transactions on an automated basis. There may further exist a need for an automated banking machine apparatus and system that is capable of being more readily reconfigured to add or delete functions and transaction types. There may further exist a need for an automated banking machine apparatus and system that may serve customers more efficiently including serving a plurality of customers simultaneously. There may further exist a need for an automated banking machine apparatus and system that is relatively compact, reliable and economical to operate.

DISCLOSURE OF INVENTION

It is an object of an exemplary embodiment of the present invention to provide an automated banking machine apparatus.

It is a further object of an exemplary embodiment of the present invention to provide an automated banking machine apparatus for carrying out a plurality of different transaction types.

It is a further object of an exemplary embodiment of the present invention to provide an automated banking machine apparatus which enables simultaneously carrying out transactions for a plurality of users.

It is a further object of an exemplary embodiment of the present invention to provide an automated banking machine apparatus that makes more effective use of floor space within a facility.

It is a further object of an exemplary embodiment of the present invention to provide an automated banking machine apparatus which is readily expanded and modified to change the types and character of available transactions.

It is a further object of an exemplary embodiment of the present invention to provide an automated banking machine apparatus for carrying out transactions for a plurality of customers simultaneously that enables servicing customers in an appropriate order.

It is a further object of an exemplary embodiment of the present invention to provide an automated banking machine apparatus for carrying out transactions on a generally automated basis but which also includes the capability of exchanging items with a remote service provider.

It is a further object of an exemplary embodiment of the present invention to provide an automated banking machine apparatus which enables carrying out transactions on an interactive basis with a human service provider.

It is a further object of an exemplary embodiment of the present invention to provide an automated banking machine apparatus that may be more readily installed.

It is a further object of an exemplary embodiment of the present invention to provide an automated banking machine apparatus that is reliable, efficient and cost effective.

Further objects of exemplary embodiments of the present invention will be made apparent in the following Best Modes For Carrying Out Invention and the appended claims.

The foregoing objects are accomplished in an exemplary embodiment of the invention by an automated banking machine apparatus and system. The system includes a machine including an enclosure with a plurality of customer stations. The system includes one or more computers within or adjacent to an interior area of the enclosure. The enclosure houses a plurality of transaction function devices in operative connection with the computer(s). The transaction function devices include at least one robotic item handling device capable of moving items between transaction function devices and user interfaces which are included in at least one customer station. The user interfaces each further include input and output devices which enable a user to provide identifying inputs and instructions to the machine.

In an exemplary embodiment of the invention, the enclosure includes one or more walls which bound the interior area of the machine. The walls are also in supporting connection with the user interfaces. The walls may be interconnected to form a kiosk or vestibule arrangement. The walls may be generally permanent or movable by authorized personnel. The housing arrangement may be located inside or outside of a building structure. The walls which bound the enclosure may include one or more interior or exterior building walls.

In some embodiments of the invention, access to the interior area of the enclosure is limited to authorized persons. Access by authorized persons may be achieved by having one of the walls bounding the housing being secured by a locking device in the operating position of the machine. Upon unlocking the locking device by an authorized person, all or a portion of the wall may be moved to provide access to the interior area of the enclosure. Alternatively lockable doors in the walls or in adjacent structures may be used to provide selective access to the interior area of the enclosure and the transaction function devices therein.

The wall arrangement bounding the enclosure of the exemplary embodiment includes at least one opening or access mechanism at each customer station. The robotic item handling device is operative to move items selectively between the transaction function devices and the customer by passing such items through the opening or access mechanism.

The exemplary embodiment of the automated banking machine and system is suitable for use in carrying out many types of transactions. A plurality of transaction function devices is positioned within the interior area of the enclosure. The transaction function devices may include various types of sheet dispensers. Such sheet dispensers may include note dispensers, ticket dispensers, check dispensers, stamp dispensers or similar dispensing devices. The interior of the enclosure may also house sheet accepting devices such as currency acceptors, check acceptors, ticket receivers or similar items.

The interior of the enclosure may also include deposit accepting devices such as a secure chest for holding deposited items. Other transaction function devices may include printing devices. Such devices may include receipt printers, check printers, ticket printers, statement printers, journal printers or other devices which print indicia on paper, special documents or sheets. Other transaction function devices within the enclosure may include a pneumatic tube type conveyor terminal for carrying items between the machine enclosure and a service provider located at a service provider station disposed from the machine. Other transaction function devices may include input and output devices which enable visual and/or audible communication between a customer station and a remote service provider station.

In the exemplary embodiment, the transaction function devices are arranged so that they may be accessed within the interior of the enclosure by the robotic item handling device. Such transaction function devices may be arranged in an efficient and compact manner. Embodiments of the invention may include supporting structures such as racks, shelves, mounting brackets or other arrangements for holding or positioning transaction function devices within the interior area of the enclosure. The available space within the enclosure and the supporting structures for transaction function devices may enable such devices to be readily added or removed.

One or more computers operating in the machine include one or more data stores in connection therewith. Data representative of a respective operating location of each transaction function device and each of the openings and access mechanisms in the customer stations may be stored in the data store. The data store may further include programs which operate to cause the robotic item handling device to move items between the transaction function devices and/or the openings and access mechanisms as required to carry out transactions.

In an exemplary embodiment, the robotic item handling device includes at least one arm movable about at least three axes. The arm is movable to any of a plurality of positions responsive to signals from the computer. The exemplary arm includes gripper fingers for selectively holding and releasing items. Such items may include items involved in banking transactions such as cash, coins, receipts, envelopes, account statements or other documents. The gripper fingers of the exemplary embodiment are also selectively rotatable responsive to signals from the computer. Such movement enables positioning the fingers to take and receive items from the transaction function devices as well as the openings and access mechanisms of the customer stations.

The computer in the machine of the exemplary embodiment is operative to process customer transaction requests.

The computer operates in response to a transaction being authorized to cause the transaction function devices to carry out portions of the transaction. The exemplary automated banking machine apparatus and system are operative to carry out banking transactions. A customer wishing to operate the machine provides inputs through a user interface at a customer station. Such inputs identify the customer and/or their account, the requested transaction type and/or an amount or quantity involved. The computer within the machine operates in accordance with its programming to determine if the transaction is authorized. This may be done locally by the computer accessing data in a local data store or through communication with one or more remote computers. If the transaction is authorized, the computer in the machine operates the transaction function devices to fulfill the customer's requests. For example, if the customer requested and has been authorized to make a cash withdrawal, the computer causes a transaction function device within the housing to dispense the requested notes. The notes may be delivered within the interior area of the enclosure through a note outlet opening on the note dispensing transaction function device. The robotic item handling device is then operative responsive to the computer to engage the notes with its gripper fingers and to move the notes to the appropriate customer opening or access mechanism from which the cash may be retrieved by the customer.

A useful aspect of an exemplary embodiment is that it may simultaneously service customers at a plurality of customer stations on the machine. In conducting banking transactions, there is often waiting time for transaction authorization or for transaction functions to be carried out. In this exemplary embodiment during such waiting times in one customer transaction, the transaction function devices are operative to carry out steps necessary to fulfill transaction requests for customers at other transaction stations. This enables the completion of all transactions more quickly. The computer operates to establish transaction sequences and to maintain records of the current status concerning all ongoing transactions to effectively carry out each of the concurrent transaction activities.

Embodiments of the automated banking machine apparatus and system of the present invention may also include communication capabilities. Such communication capabilities may enable a remote service provider to communicate with customers at a selected customer station. This may be accomplished through video and/or audio connections with the appropriate customer station. Embodiments of the invention may also enable the service provider to exchange items with the customer through a pneumatic tube conveyor or other transport device that extends between the housing of the transaction machine and a service provider station.

Exemplary embodiments of the apparatus and system may also include the capability of providing customers with visual and audio materials through output devices at the customer station. This may be done during waiting times during transactions or while a customer is approaching the machine to begin a transaction or after completion of transaction activities. Exemplary embodiments of the apparatus and system include one or more video material presentation devices which enable presentation of video material. The presentation device is in operative connection with output devices of the customer stations through a video switching device. The video presentation material may include information intended to be of interest to the user. Such material may be general information of interest to most users or may be selected based on the identity of the particular user or to a person in the user's particular circumstances. One or more computers operating in the machine may cause video materials to be presented and may serve as a video switching device. In other embodiments other devices may be used for presenting and switching the materials, including switching devices that operate under the control of a human service provider.

BEST MODES FOR CARRYING OUT INVENTION

Figure 1:
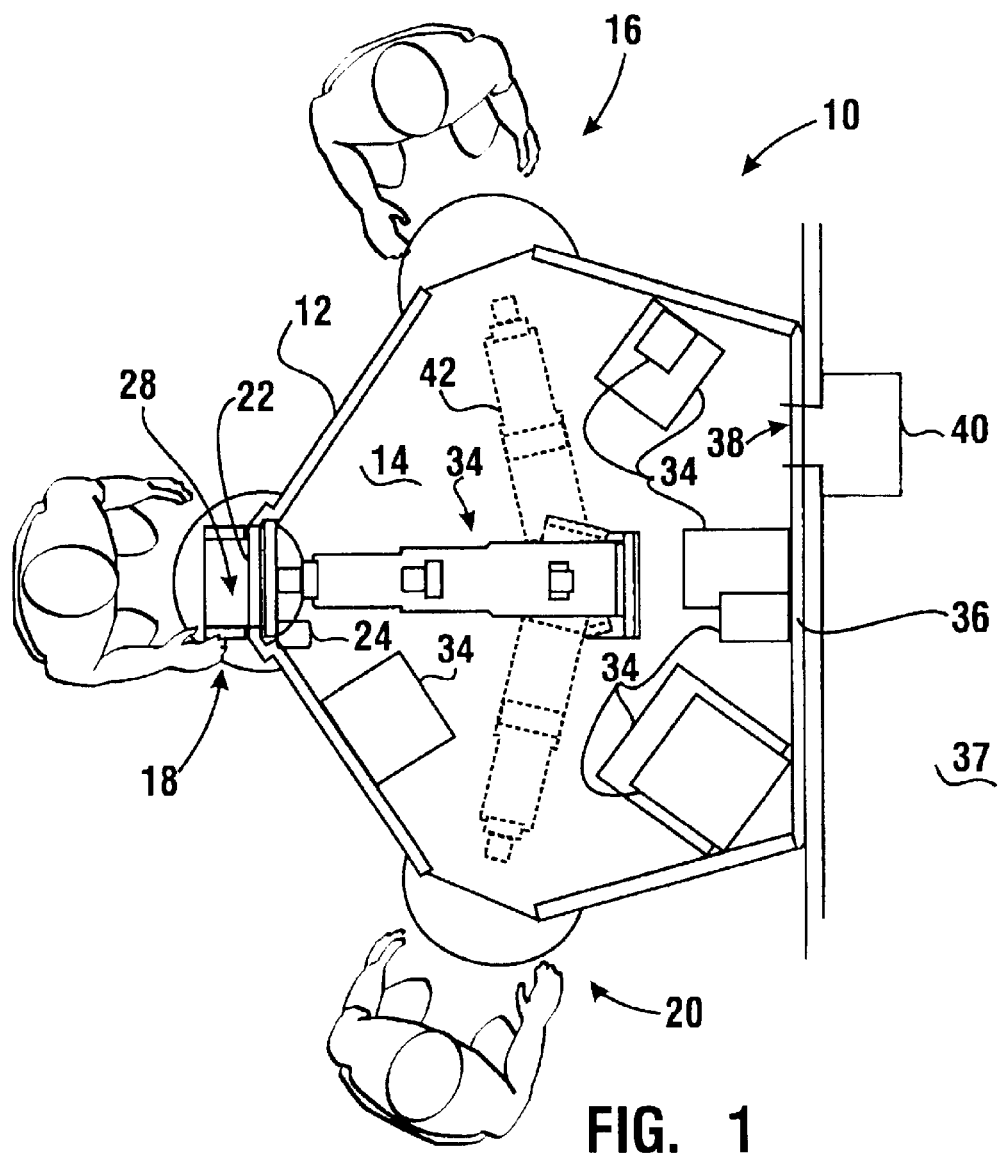
FIG. 1 is a top view of an exemplary automated banking machine apparatus used in connection with the present invention.

Referring now to the drawings and particularly to FIG. 1, there is shown therein an exemplary automated banking machine 10 of the present invention. Machine 10 includes an enclosure which is alternatively referred to as a housing 12. Housing 12 comprises a plurality of wall segments which bound an interior area 14 of the machine.

Housing 12 provides three customer stations 16, 18 and 20. A customer is enabled to conduct transactions at the machine from each of the customer stations. It should be understood that while the exemplary embodiment includes three customer stations, other embodiments of the invention may have a fewer or greater number of customer stations. In the exemplary embodiment, the customer stations are similar and only one will be described in detail.

Customer station 18 includes a user interface 21. The user interface includes at least one output device. In the embodiment shown, display 22 serves as an output device. Display 22 may include a CRT, LCD or other type device for providing visual outputs. Of course other types of output devices such as speakers, braille pads or other devices suitable for providing outputs to a user may be included in an alternative user interface.

The user interface 21 also includes at least one input device. The input devices may include a touch screen interface which may be used to sense the position of a user's finger adjacent to display 22. Through such a touch screen input device, a user is enabled to provide inputs responsive to outputs presented on a screen. Alternatively or in addition, other types of input devices may be included at a customer station. Such input devices may include a keypad, function keys, microphones or other devices through which a user may make selections or provide information.

Another type of input device included in the exemplary embodiment of the user interface is a card reader 24. Card reader 24 is positioned in supporting connection with the housing 12 and is accessible through a card slot 26. In the exemplary embodiment the user is enabled to insert a magnetic stripe type card through the card slot. Indicia that is encoded on the card is read by the card reader 24. Such indicia generally includes data representative of a user and/or their respective account(s) concerning which the user conducts transactions. It should be understood that while a magnetic stripe type card reader is described in connection with the exemplary embodiment, other embodiments of the invention may use other types of card reader or input devices for identifying a user. Such devices may include for example a "smart card" reader which is used for reading a programmable memory positioned on a card. The information included in memory may include data representative of a user and/or their accounts. Such encoded data may also include data representative of monetary value which may be added to or subtracted from the card memory as transactions are conducted. In other embodiments the user interface may include a card slot. Cards may be taken from the card slot to a card reader in the interior area of the housing to be read in a manner later discussed. Other types of input devices may be used in connection with embodiments of the invention such as biometric type reading devices, voice recognition devices, speech recognition devices, imaging devices or other devices that are capable of receiving inputs which identify a user and/or through which a user may input instructions.

The user interface 21 at customer station 18 may include one or more customer access mechanisms. In the exemplary embodiment a customer access mechanism includes a tray mechanism 28. Tray mechanism 28 includes a delivery area 80 for holding items which are transferred between the customer and the machine. The tray mechanism is selectively movable in the exemplary embodiment between positions in which a delivery area 80 is moved between a position in the interior area 14 of the housing and a position accessible from an exterior area of the housing in which items in the delivery area of the tray may be accessed by a customer. It should be understood that while in the exemplary embodiment the tray mechanism 28 is used as a customer access mechanism, in other embodiments other mechanisms may be used for exchanging transaction items with a customer. Such access mechanisms may include various forms of openings, drawers, transports, pockets, slides or other devices that are suitable for passing one or more of the types of items involved in transactions conducted at the machine. For purposes of this disclosure, all such items shall be referred to as a tray.

In the exemplary embodiment interior area 14 of machine 10 includes one or more computers 30. (See for example FIG. 23). The computer 30 is in operative connection with one or more data stores schematically indicated 32. Data store 32 holds programs and data suitable for operating the machine and/or providing communications with other systems and devices. It should be understood that while in the exemplary embodiment only one computer and data store are shown, other embodiments may include a plurality of operatively connected computers and data stores. For purposes of this description, references to a computer shall also be construed to encompass a plurality of connected computers, and references to a data store shall be construed as encompassing one or more data stores which are accessible by one or more computers.

In the exemplary embodiment computer 30 is in operative connection with a plurality of transaction function devices schematically indicated 34. The transaction function devices include devices which can be operated responsive to the computer to carry out one or more types of transactions which are requested by customers operating the machine. In the exemplary embodiment of the invention the transaction function devices 34 may include devices such as card reader 24, currency dispensers, ticket dispensers, printers, deposit accepting devices, transports and other mechanisms that can be operated under the control of the computer. Such transaction function devices are shown positioned in the interior area 14 of the machine in FIGS. 1 and 2. For purposes of this description the one or more computers which operate in the machine may alternatively be referred to as a controller.

Transaction function devices may be arranged about the interior area of the housing in various configurations. For example, such items may be vertically stacked on top of or above one another or supported from the walls of the housing. Such transaction function devices may also be disposed on racks or shelves or other suitable supporting devices. Transaction function devices such as currency dispensers may also be positioned in separate enclosures which are supported on a floor surface and anchored thereto. Such devices may include a secure chest with a suitable lock and which may be accessed only by authorized personnel. Similarly deposit accepting mechanisms for accepting deposits in the form of envelopes, sheets or other items may be housed within secure enclosures positioned within the interior area of the housing of the machine.

Transaction function devices may also be positioned in areas adjacent to the housing and accessible within the interior area. For example, FIG. 1 shows the housing 12 in abutting relation with a wall 36. The wall separates the interior area 14 of the enclosure from a room 37. An opening 38 which extends through the wall enables a transaction function device 40 to deliver items to or receive items from the interior area through the opening 38. An example of such an item might be a bill dispenser that selectively dispenses bills or stacks of bills through the opening. This may enable providing enhanced security for device 40 by placing it behind a building wall or other structure. Of course mechanisms may be provided for limiting access through the opening 38. Other openings may also be provided in the wall. For example, in some embodiments a depository for holding deposit envelopes may have items deposited therein through an opening in the wall.

In the exemplary embodiment, one of the transaction function devices included in the interior area 14 is a robotic item handling device 42. The robotic item handling device later described in detail, is usable in the exemplary embodiment to move items involved in transactions between the tray or other customer access devices, and other transaction function devices. The robotic device 42 operates responsive to the computer 30 to grasp and move items between the customer stations and other transaction function devices, responsive to the inputs from the customers and the signals which control or result from operation of the devices in performing transaction functions.

Figure 23:
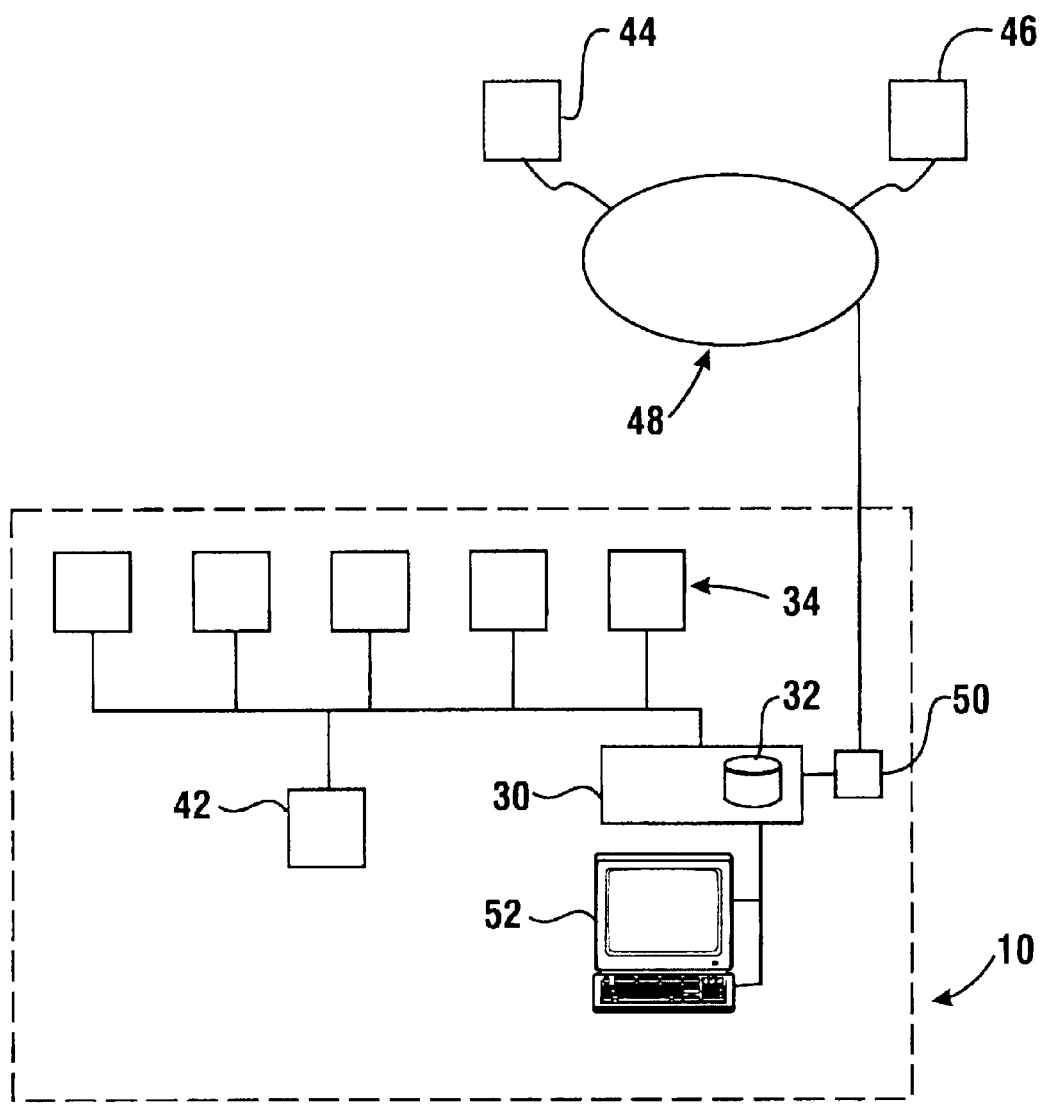
FIG. 23 is a schematic view of an automated banking machine and system used in connection with an exemplary embodiment of the invention.

As shown in FIG. 23, a computer 30 of an exemplary embodiment is in communication with one or more remote computers 44 and 46. The computer 30 communicates with the remote computers through a network 48. Network 48 may be any of a number of types of communication networks such as a telecommunications network, lease line, dial-up connection, wireless network, local area network, or wide area network such as the Internet. Computer 30 communicates messages with the network and the host computers through a suitable communications interface 50.

In an exemplary embodiment, the computer 30 operates in accordance with its programming to operate an output device to prompt a customer to provide identifying inputs to the machine. This may be done by a customer through input of a card such as a debit card and a personal identification number (PIN), or through other suitable identifying inputs. The customer is also prompted responsive to operation of the computer 30 through an output device to input the type of transaction they are requesting and the amount or character of the transaction requested. Using this information, the computer operates to formulate a transaction request message which is routed to the host computer which can authorize the customer's requested transaction.

Upon receipt of the message or messages from the computer 30, the host computer operates responsive to its programming and data that is accessible in one or more associated data stores to determine if the customer is authorized to conduct the transaction. The host computer then responds to the machine 10 through the network with a message which includes data representative of whether the transaction is authorized. In response to receiving a message that indicates that the transaction is authorized, the computer operates to cause the transaction function devices to carry out steps which are required to complete the requested transaction. The computer also operates to control the robotic item handling device to move items between the customer station and the appropriate transaction function devices. After carrying out the transaction the computer 30 of the exemplary embodiment operates to communicate with the appropriate remote computer to confirm that the transaction was successfully carried out. It should be understood that the sequence of transaction messages is exemplary and in other embodiments other sequences and message types may be used.

As shown in FIG. 23, machine 10 also has in operative connection with the computer 30 an operator interface 52. Operator interface 52 may include appropriate input and output devices. A bank or other entity operating the machine may use the operator interface to appropriately program the computer and load data into its associated data store. Operator interface 52 may in various embodiments be a generally permanent part of the transaction machine. Alternatively operator interface 52 may be a hand-held or other portable type computer which may be connected to computer 30 for loading instructions and data therein. In embodiments of the invention computer 30 may be programmed remotely through one or more other terminals which are connected to machine 10 through the network 48.

Machine 10 may also include other types of transaction function devices and/or interfaces which enable a customer to communicate with and/or exchange items with a live service provider. In some embodiments of the invention, the transaction function devices may include devices such as a camera or other imaging device, and audio input devices such as microphones and audio output devices such as speakers, handsets or other devices which are capable of providing audio information to the customer. Upon the customer or the service provider providing an appropriate input, the customer may be placed in one-way or two-way video and/or audio communication with a service provider located remotely from the machine. This may be done by a local hard wired connection when the service provider is located in proximity to the machine. Alternative embodiments of the invention may provide for the computer 30 to operate in connection with devices for producing images. This may include, for example, one or more cameras located at the machine and/or the service provider station, and transmitting image data through the network. Such data may be output in the form of images on displays enabling generally real time video conferencing between the customer and the service provider. Similarly audio information may be transmitted therebetween the customer and the service provider enabling the service provider and the customer to communicate in generally real time. Such communications may be useful in operations such as check cashing, loan application, bank check printing or other activities that may be carried out at the machine.

Figure 24:
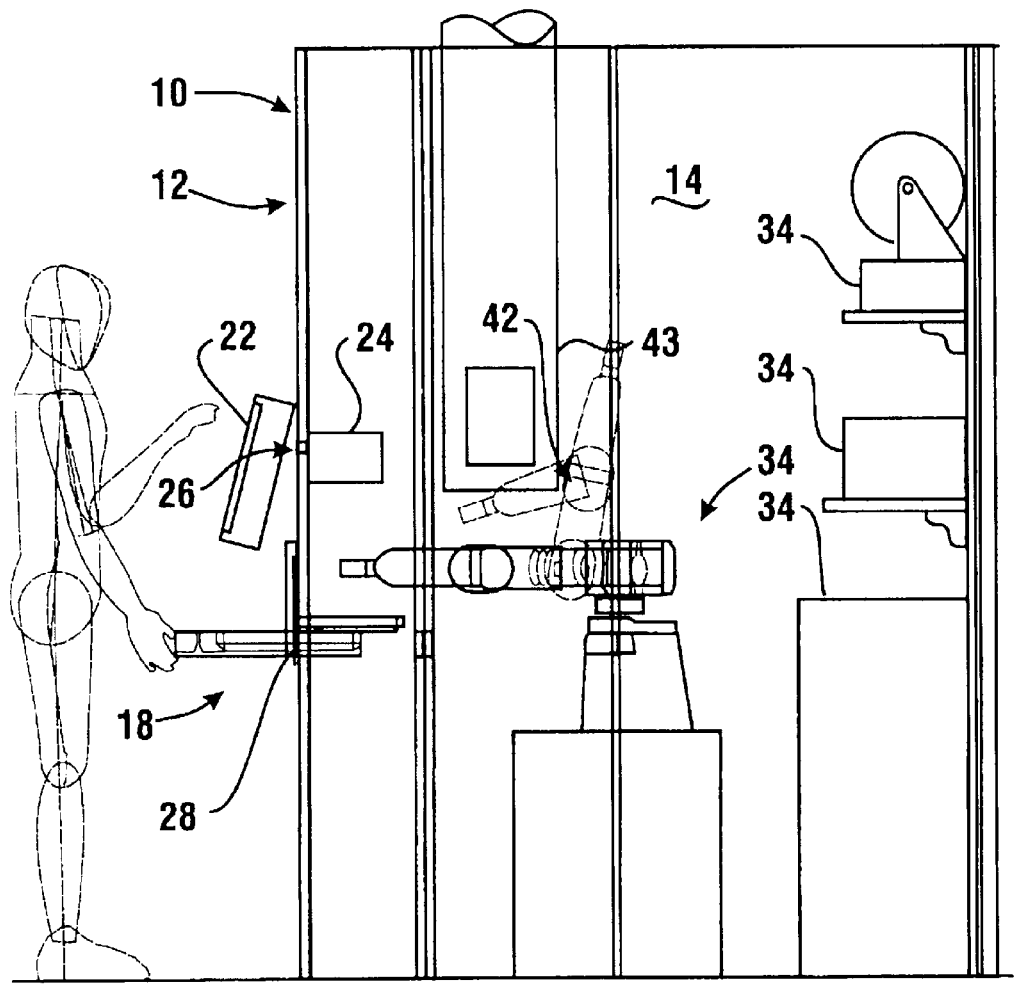
FIG. 24 is a transparent side view of the automated banking machine similar to that shown in FIG. 2 and further including a pneumatic transfer device.

Alternative embodiments of the invention may also include the capability for a customer at the machine to exchange items with a remote service provider. This may be done by providing a pneumatic tube type conveyor system or other item transport device between the machine 10 and a remote service provider station. FIG. 24 shows a pneumatic tube conveyor delivery mechanism 43. In some embodiments the pneumatic transfer system may be of a type shown in U.S. Pat. No. 6,146,057 which is owned by the assignee of the present invention and the disclosure of which is incorporated herein by reference. Another example of such a system is shown in published International Patent Application PCT/US98/09178 the disclosure of which Application is also incorporated herein by reference as if fully written herein. The use of such pneumatic tube conveyor systems may enable a customer to exchange items with a service provider or another transaction performing device to facilitate carrying out transactions.

Exemplary embodiments of the invention also include in the data store 32 associated with computer 30, or in another connected storage device, data or instructions corresponding to presentation materials which can be presented to customers. Such presentation materials may include video and/or audio type presentations that may be of interest to customers generally or to customers in particular situations. The computer 30 may be programmed to operate to cause such materials to be displayed to customers operating the machine. This may be done for example during waiting times in the transactions such as when the machine is operating to perform transaction authorization, to print or move materials or to carry out transaction functions for other customers. Alternatively such materials may be presented before or after transactions. Such materials may be directly targeted to the particular customer based on information concerning the customer's account, the particular transaction the customer wishes to conduct or other stored or derived information. Alternatively, a service provider may operate a connected switching device or cause the computer to selectively output presentation materials to the customer that the service provider considers appropriate.

Figure 3:
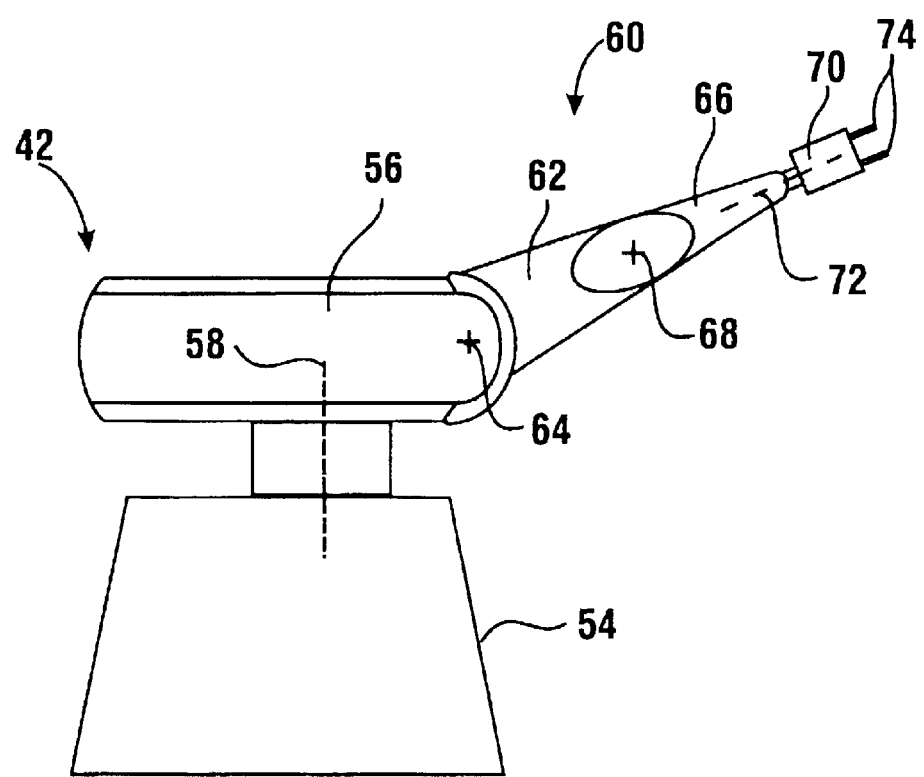
FIG. 3 shows an exemplary robotic item handling device which is used as a transaction function device in the exemplary embodiment.
Figure 4:
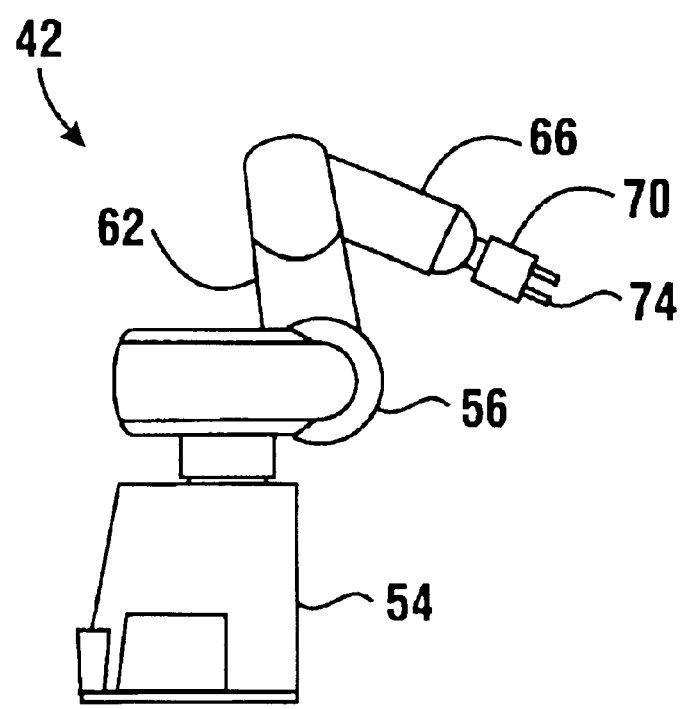
FIG. 4 shows the robotic item handling device of FIG. 3 with an arm in a retracted position.

FIGS. 3 and 4 show an exemplary form of the robotic item handling device 42 used in connection with machine 10. The robotic item handling device generally is enabled to operate to grasp and move items between the user interfaces at the customer stations and the transaction function devices. The exemplary form of the robotic device 42 enables manipulating items about three axes. Of course, in other embodiments other types of additional handling devices may be used.

Figure 31:
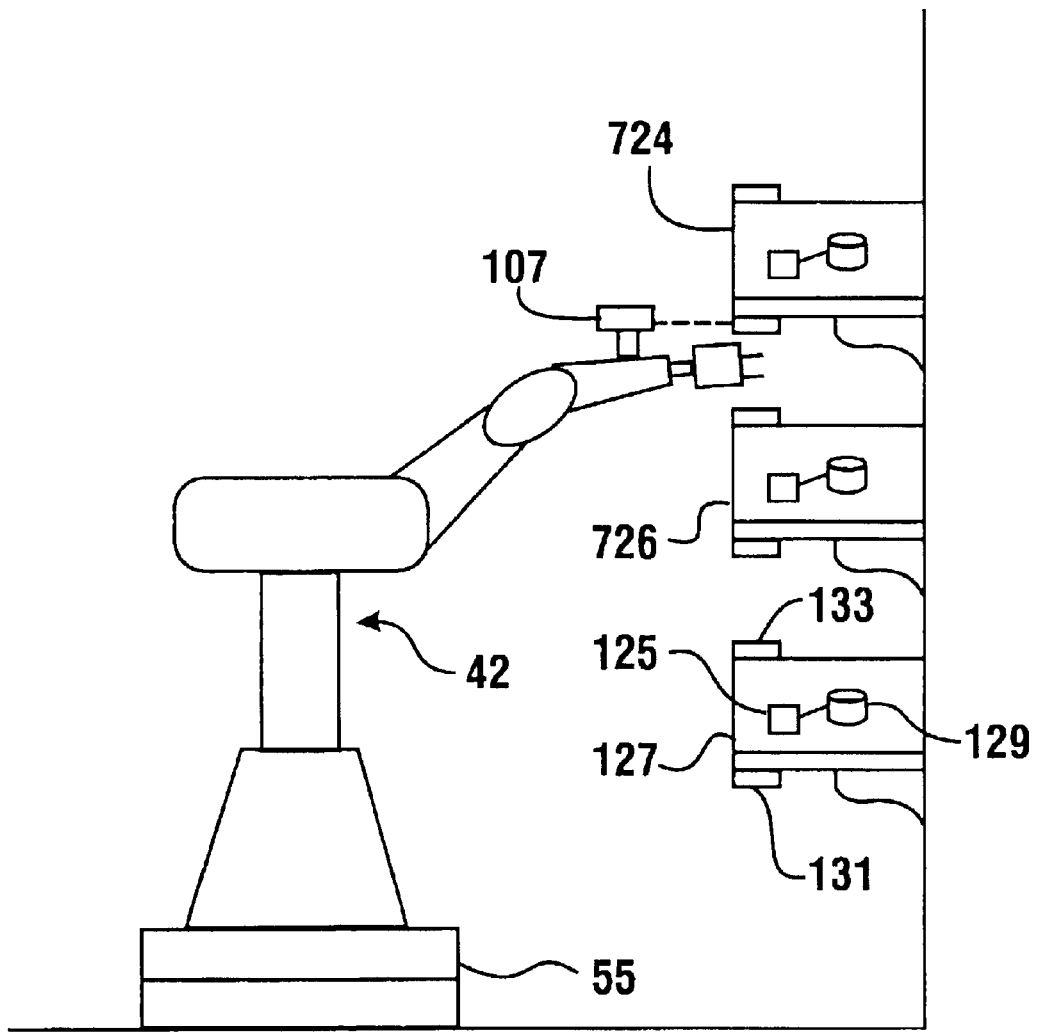
FIG. 31 is a schematic side view representing the operation of an embodiment of the invention which includes location indicators and device type identifying indicators on transaction function devices.

Device 42 includes a base portion 54. Base portion 54 of the described embodiment is stationary. However, it should be understood that in other embodiments the base portion may be moved on a slide mount or other actuator device 55 such as is shown in FIG. 31, responsive to operation of the computer 30. This may provide for additional movement capabilities for the device, such as between more widely, transversely disposed customer stations or transaction function devices.

In the exemplary embodiment, device 42 further includes a head portion 56. Head portion 56 is selectively rotatable relative to base portion 54 about an axis 58. Servomotors or other suitable moving devices are used in connection with the robotic item handling device for achieving the desired movement in a controlled manner.

Head portion 56 is connected to an arm 60. Arm 60 includes a first arm portion 62. Arm portion 62 is selectively rotatable relative to head portion 56 generally about an axis 64. A second arm portion 66 is in supporting connection with arm portion 62. Arm portion 66 is rotatable relative to arm portion 62 generally about an axis 68.

Arm portion 66 is in supporting connection with a rotatable claw member 70. Claw member 70 is rotatable relative to arm portion 66 about an axis 72. Claw member 70 further includes a pair of relatively movable gripper members which in the exemplary embodiment include a pair of opposed fingers 74. Gripper fingers 74 are selectively movable relative to one another to selectively grasp and release items.

Figure 2:
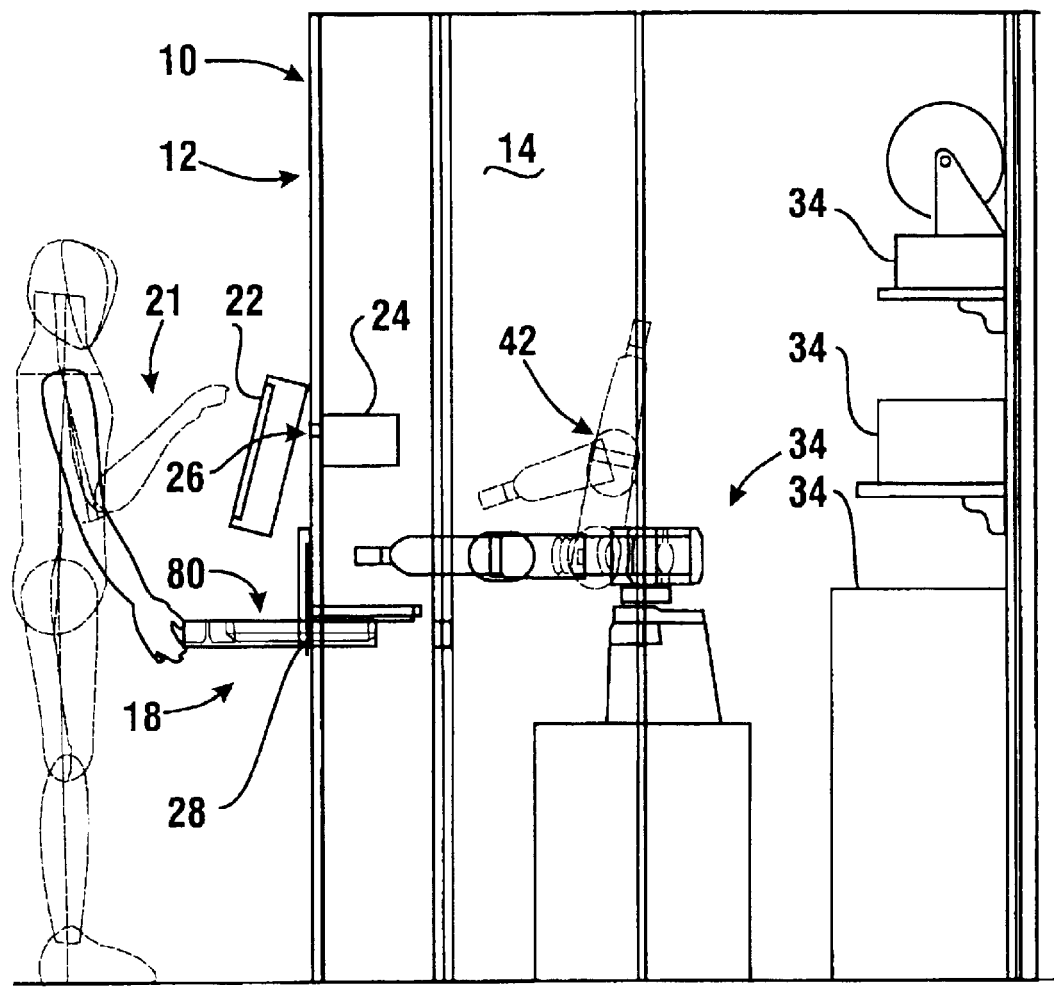
FIG. 2 is a transparent side view of the automated banking machine shown in FIG. 1.
Figure 5:
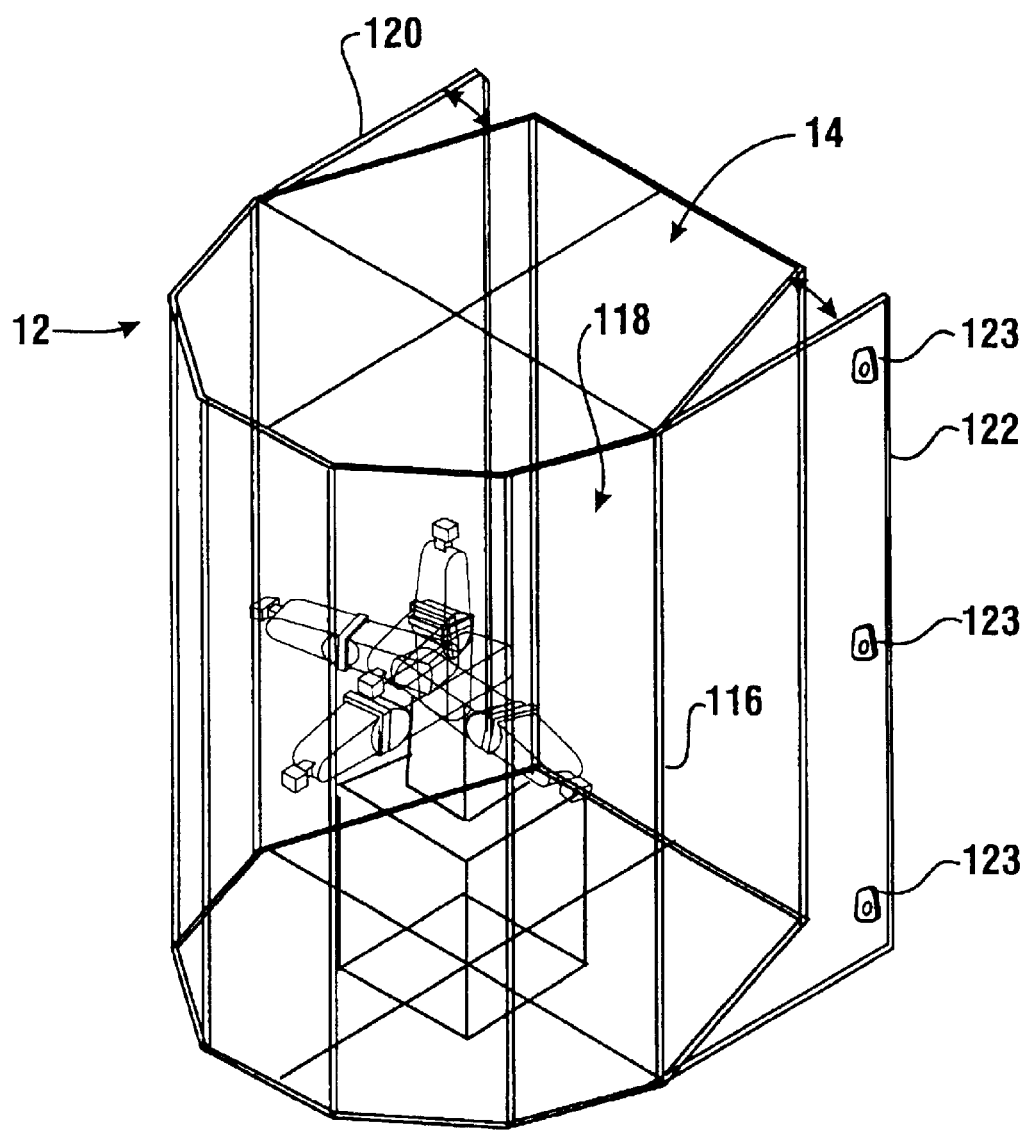
FIG. 5 is an isometric view of an exemplary enclosure structure used in connection with an automated banking machine apparatus of the present invention.

As represented in FIGS. 1, 2, and 5 the robotic item handling device 42 is enabled to move responsive to operation of the computer to move the gripper fingers throughout a range of positions relative to the interior area 14 of the machine 10. This includes engaging the gripper members with items delivered by a user into the tray or other openings or access mechanisms, and placing such deposited items into appropriate engagement with transaction function devices. Likewise the robotic item handling device 42 is enabled to move items from one transaction function device to another within the interior of the housing, as well as to move items from a transaction function device to the delivery area of the appropriate tray or other opening or access mechanism which enables a customer to access the particular item. As can be appreciated from FIG. 1, the robotic item handling device is enabled to take items from and deliver items to all three customer stations in this exemplary embodiment. In addition, the machine 10 may operate under the control of the computer to have transactions ongoing with multiple customers at several customer stations simultaneously.

Figure 9:
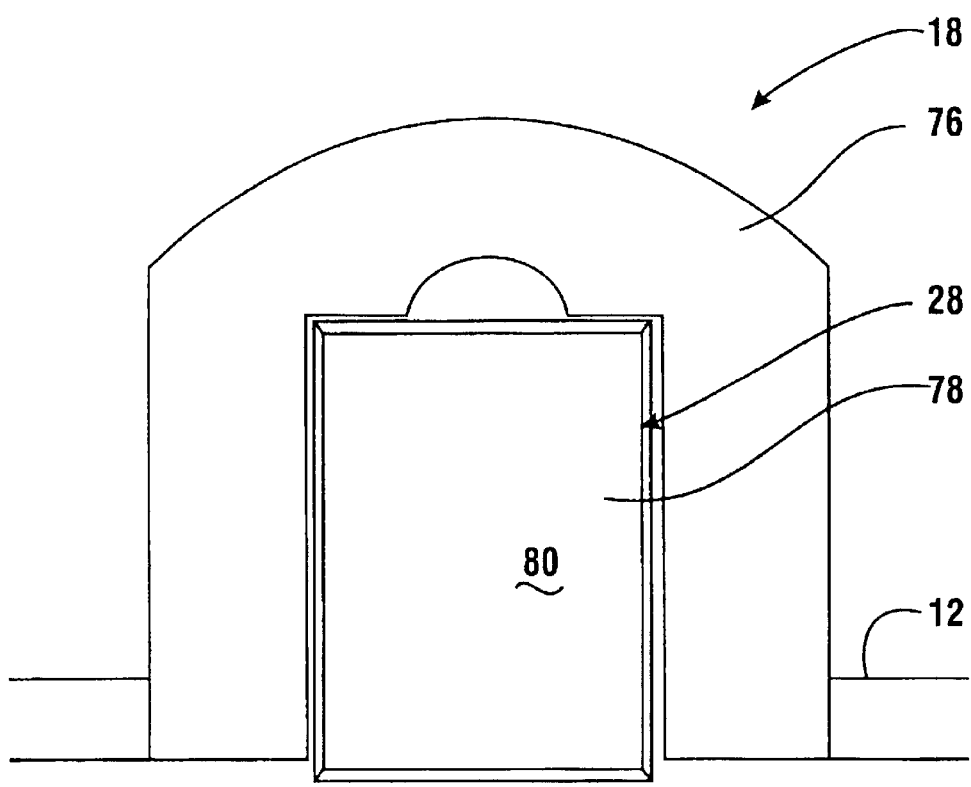
FIG. 9 is a top view of a customer station of an exemplary embodiment of an automated banking machine.

In the exemplary embodiment, the robotic item handling device 42 operates under the control of the computer to move the tray mechanism 28 between an extended position in which the delivery area 80 of the tray is accessible to a customer, and a retracted position in which the delivery area of the tray is moved inside the housing. FIG. 9 shows a top plan view of the customer station 18 with the tray mechanism 28 in an extended position. Exemplary user interface 21 of customer station 18 includes a shelf 76. A tray housing 78, which is part of the tray mechanism 28, is shown in the outwardly extended position in FIG. 9. In this position, shelf 76 extends in generally surrounding relation of the tray housing. Shelf 76 provides a suitable work surface for customers on which to place items or to write information when conducting transactions. Tray housing 78 includes the delivery area 80. Delivery area 80 is suitable for having items placed therein which are to be received from or delivered to one of the transaction function devices. This may include for example currency, passbooks, tickets, receipts, envelopes, in some cases cards, or other items which are moved between the customer and the transaction function devices.

Figure 11:
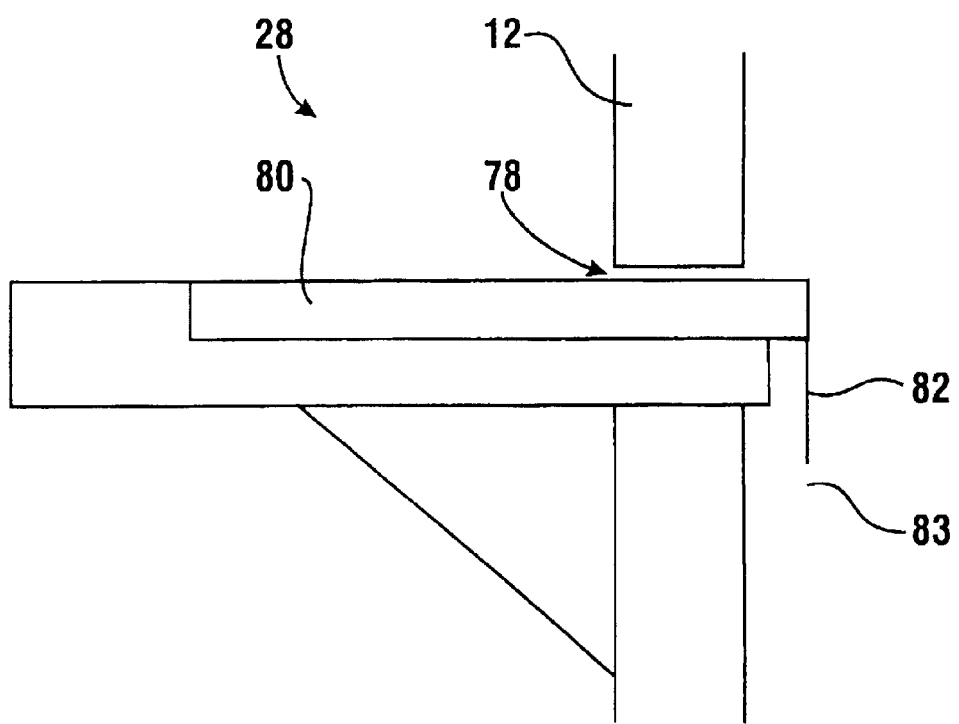
FIG. 11 is a side view of a tray of a customer station in an extended position.

As shown in FIG. 11, in the exemplary embodiment tray housing 78 has in connection therewith an actuating member 82 which extends in cantilevered relation therewith. In the exemplary embodiment actuating member 82 comprises a semi-rigid resilient member which is suitable for imparting sufficient force to move the tray housing 78 between the extended position shown in FIG. 11 and the retracted position shown in FIG. 12. However, the characteristics of the actuating member 82 are such that if the tray 78 encounters an excessive resistance to movement, actuating member 82 will deform. The resilient nature of the preferred form of the actuating member 82 enables it to spring back into position after such deformation.

In the exemplary embodiment, the tray 78 is moved between the extended and the retracted positions by the robotic item handling device 42. When the delivery area 80 of the tray is to be retracted, at least one of the gripper fingers 74 engages the actuating member 82 adjacent a free end 83 thereof, and pulls the tray housing 78 inward to the retracted position shown in FIG. 12. Similarly when the delivery area 80 of the tray is to be extended at least one gripper finger 74 engages and pushes outward on the actuating member 82 adjacent the free end until the delivery area moves to the extended position. If a problem is encountered in moving the tray in either direction in this exemplary embodiment, the actuating member deforms so that the gripper finger moves past the actuating member without causing damage to either the tray mechanism or the gripper finger. This avoids problems in the event that the tray mechanism or another item being moved has become stuck.

Figure 12:
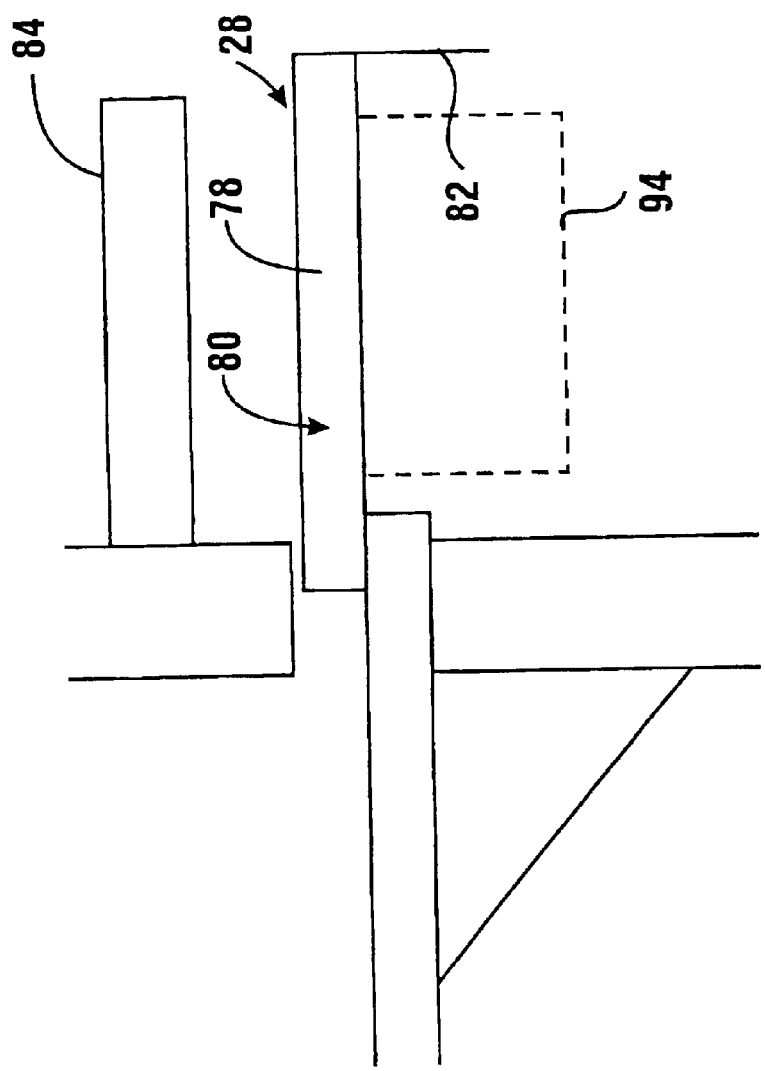
FIG. 12 is an exemplary view of the tray shown in FIG. 11 in a retracted position.
Figure 13:
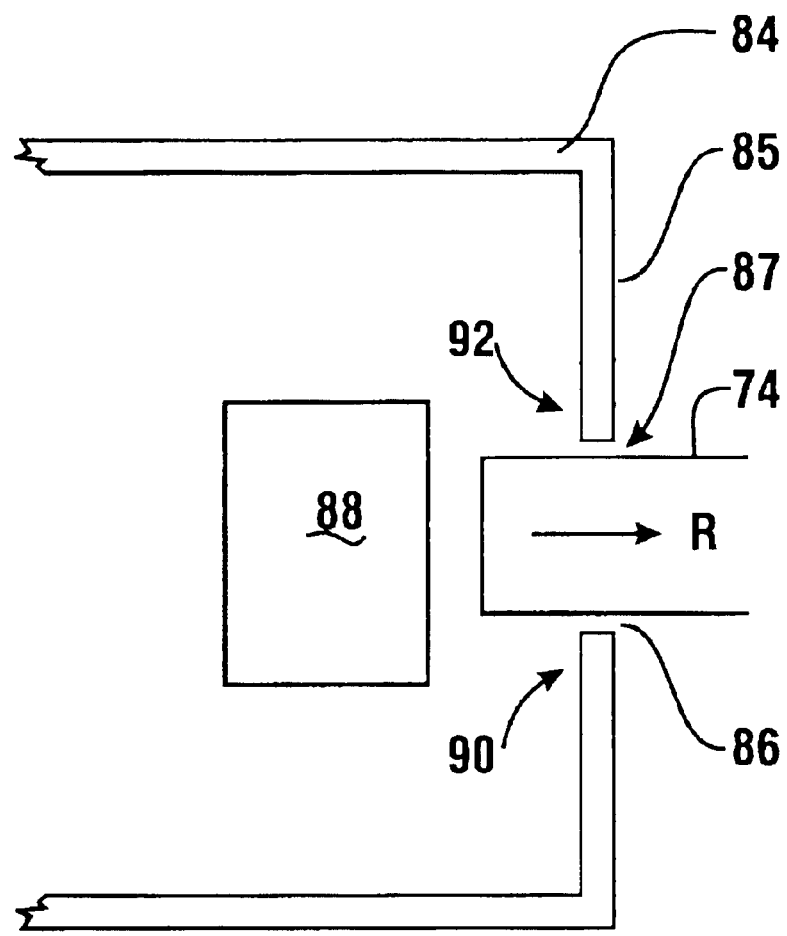
FIG. 13 is a top plan view of a robotic arm positioned adjacent to a separator member which is positioned above an extendable tray.

As shown in FIGS. 12 and 13 in an exemplary embodiment, a separating member 84 extends adjacent to, and in the exemplary embodiment, above the delivery area 80 of tray housing 78 when the tray is in the retracted position. In the exemplary embodiment separating member 84 is generally U-shaped in cross section. Member 84 includes a wall 85 having a vertically extending slot or opening 86 therethrough with an open top 87 as shown in FIG. 13. Opening 86 is sized for accepting gripper fingers 74 therein in generally close fitting relation.

As represented in FIG. 13 separating member 84 serves to provide greater assurance that items which are to be deposited in the delivery area of the tray are separated from the gripper fingers. As represented in FIG. 13 an item 88 is moved by the gripper fingers into an area above and in registration with the holding area 80 of the retracted tray. The gripper fingers which are holding the item are moved by device 42 responsive to the computer downward into the opening 86. The gripper fingers then move apart which enables the item to move relative to the gripper fingers. To assure that the item has separated, the gripper fingers 74 move generally horizontally and in an inward direction out of the opening 86. The wall portions 90 and 92 of wall 85 adjacent to the opening 86 engage items that may continue to be carried by the gripper fingers as the gripper fingers retract in the direction of arrow R. This assures that items that are to be deposited into the tray fall into the delivery area and are not retracted with the gripper fingers.

It should be understood that this arrangement is exemplary and other arrangements may be used for separating items from their respective holding devices. For example, in some embodiments the wall which performs the equivalent function of wall 85 may be a wall bounding the delivery area of the tray. In some embodiments separating mechanisms may include for example, scrapers or brushes which engage an item and separate it from a holding member. Alternatively, pneumatic flow, vibration, electrostatic charge or other similar techniques may be used to assure separation of items from a holding member. The particular technique used will depend on the particular items being transported and deposited in the housing area.

As represented in FIG. 12, tray housing 78 may include a trap door 94 indicated in phantom, or a similar device in connection with the holding area thereof. Trap door 94 may be actuated by the gripper fingers or other suitable devices for purging the delivery area 80 of items held therein. This may be desirable for example when items have been provided to a customer and suitable sensors in or adjacent to the tray sensing that the customer has failed to remove the items from the tray. Alternatively, the trap door 94 may be operated when it is desired to capture from the customer an item that has been presented. Such a mechanism enables removing such an item from the tray and storing the item within the machine for later recovery or analysis. It should be understood however that trap door 94 is exemplary and in other embodiments other suitable mechanisms may be used for this purpose.

Figure 10:
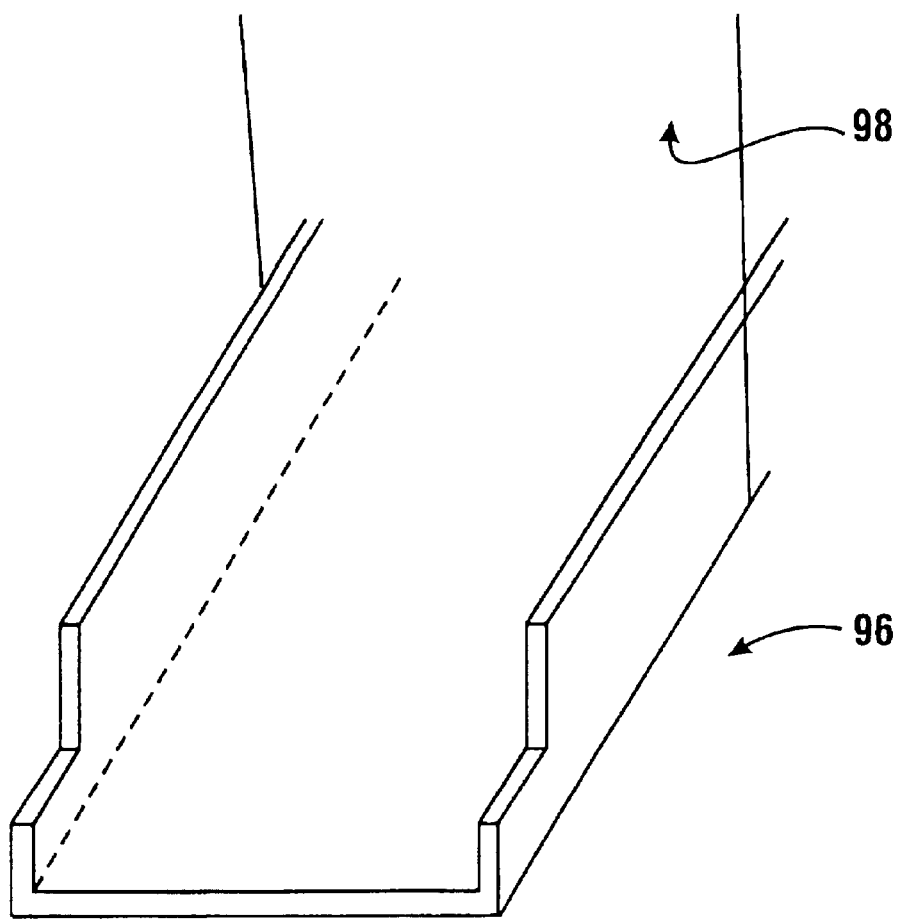
FIG. 10 is an isometric view of a carrier member used in connection with an exemplary customer station.
Figure 25:
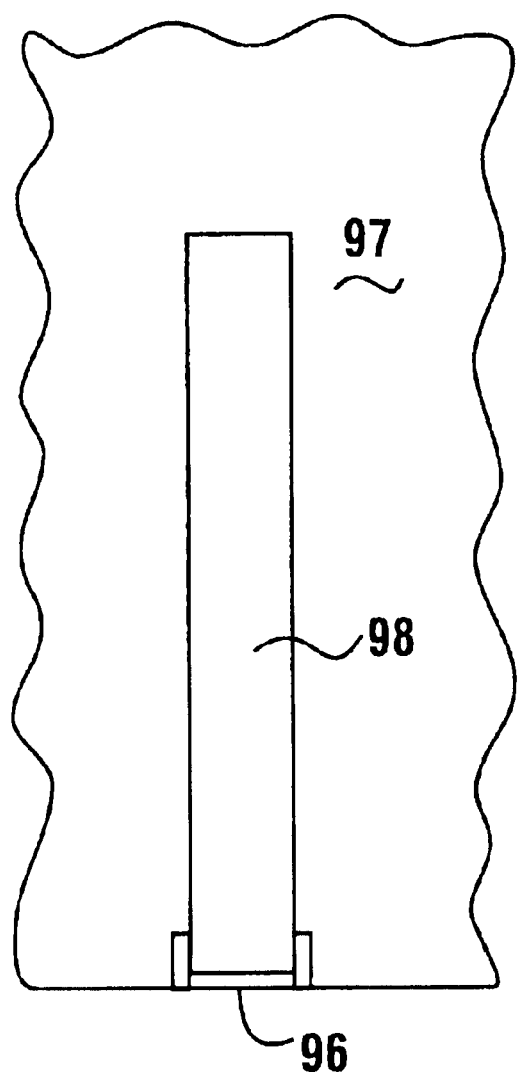
FIG. 25 is a front plan view of a slot included in a user interface for delivering and receiving items from an exemplary automated banking machine.
Figure 26:
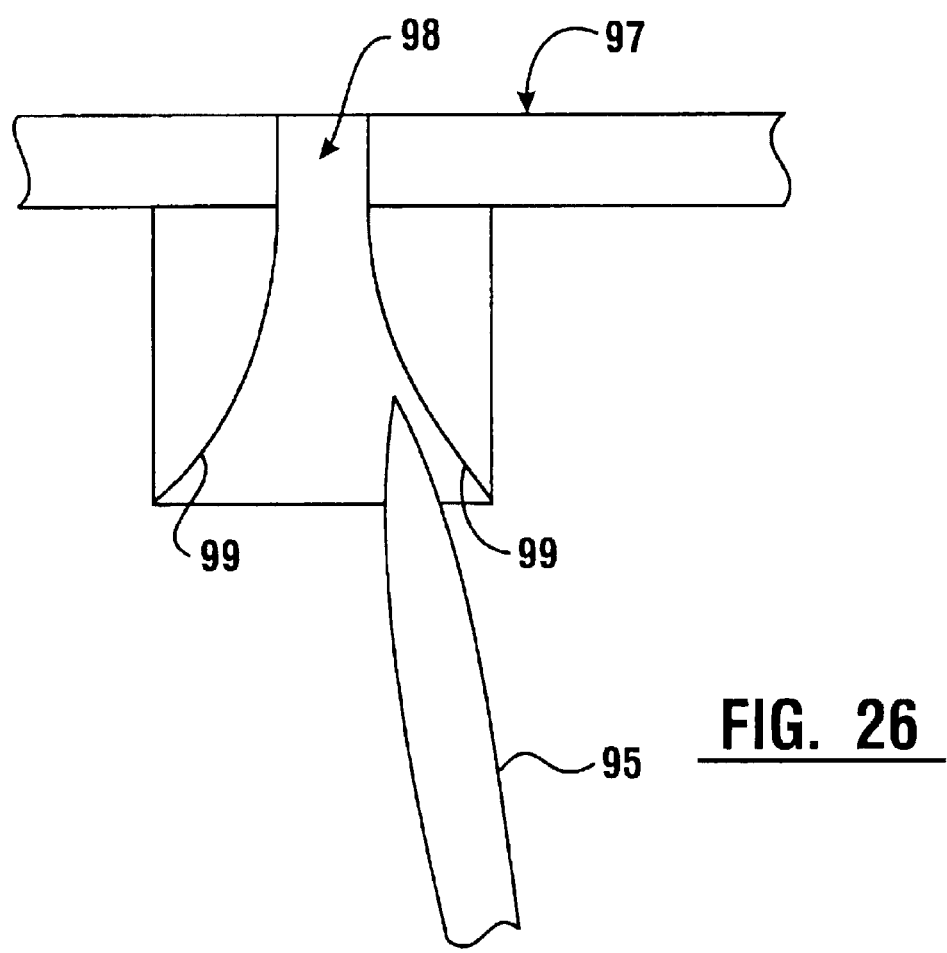
FIG. 26 is a top view of the slot shown in FIG. 25 including convergent side members for guiding items therein.

While the exemplary form of the invention has been described in connection with using a tray for moving items between the transaction function devices and a customer, other types of item communication mechanisms may be used. For certain types of items it may be difficult for the gripper fingers to remove the items from a tray. For such items it may be desirable for a user to deliver the items in a particular orientation to facilitate grasping the items with the gripper fingers (or other suitable grasping member) of the robotic item handling device. One such item which is made easier to handle through proper orientation is a deposit envelope. FIGS. 10 and 25 show a carrier member 96 for orienting a deposit envelope 95 or other item that is to be received from or delivered to a user by the machine. Carrier member 96 is sized to extend in a vertically extending slot or opening 98 in a panel 97 of the machine housing. In the exemplary embodiment opening 98 is sized so that a deposit envelope 95 is enabled to extend generally vertically therein. This is achieved by having the base surface of carrier member 96 sufficiently narrow so that the deposit envelope is constrained to sit generally upright within the slot 98. Convergent guides 99 extend within the interior area of the housing adjacent the slot 98.

In operation of the machine, the robotic item handling device 42 is enabled to grasp an envelope sitting generally upright in the slot 98 in supported connection with the carrier member 96. This may be done by the gripper fingers initially being spread apart and then moving in close proximity to one another above the carrier member 96. Alternatively the gripper fingers may move adjacent to or above the carrier member so as to place the envelope in a particular orientation relative to the slot 98 and in abutting relation with a selected one of the guides. Thereafter once the envelope is moved into a particular orientation the gripper fingers may move further adjacent and may grasp the envelope. The envelope may then be moved to a printer to label it with identifying indicia and/or into an opening to a secure chest.

It should be understood that structures which operate in a manner similar to carrier member 96 and opening 98 may be used for passing other types of items between the machine and the user. For example, the machine may operate to provide a user with a deposit envelope by moving the deposit envelope outward through the opening 98. The computer may operate the gripper fingers so as to align the envelope with the carrier member. In the exemplary embodiment the funnel-shaped passage provided by the convergent guides 99 facilitate the engagement of envelopes or other items therewith so that they are deposited on the carrier member by the gripper fingers and are accessible to the customer through the slot 98. In addition other items passed between users and the machine such as passbooks, cards, coins, cards, or other items may be handled more effectively when placed in a particular orientation by a user and when passed through the housing of the machine. Various forms of suitable carrier members and openings may be devised based on the particular type of item to be transported and the gripper member type to be used.

Figure 18:
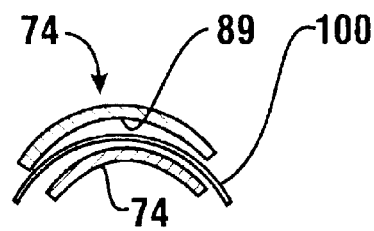
FIG. 18 is a front plan view of gripper fingers on the robotic arm operating to grip a sheet.

In an exemplary embodiment gripper fingers 74 are provided with a particular cross-sectional configuration which facilitates the holding, straightening, and presentation of flexible sheet-like materials. As shown in FIG. 18 the exemplary form of the gripper members has a cross section in which an outer arcuate bounding surface 89 of one gripper finger is enabled to move into generally opposed adjacent engagement with an arcuate bounding surface 91 of the opposed gripper member. As shown in FIG. 18 this enables imparting an arcuate curved contour in cross section to sheets engaged with the gripper fingers such as sheet 100 shown. It should be understood that the configuration of a gripping finger shown is exemplary and in other embodiments other configurations of gripper members may be used to achieve the cross sectional curved contour when sheets are engaged with the gripper members. For example, in other embodiments it may be necessary for only one gripper member to have an arcuate bounding surface so as to achieve the desired contour of items engaged therewith. Alternatively or in addition, other embodiments may include a plurality of gripper members or a plurality of contact points for engaging items on a single gripper member so as to achieve an arcuate contour for flexible sheet-like items.

Figure 17:
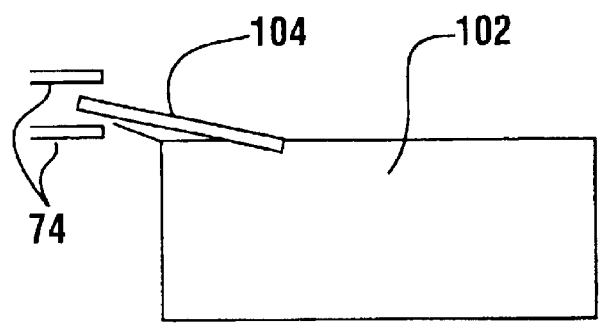
FIG. 17 is a side view of gripper fingers on a robotic arm in a position to grip a sheet presented by a transaction function device.

An advantage of the configuration of sheets when in engagement with the exemplary gripper members is represented in FIGS. 17 and 19–22. In embodiments of the invention customers may need to provide or receive relatively long and/or large sheets of material. This may occur for example, when a customer is provided with an account statement or a graph showing performance of a customer's particular investments. Such sheets may be in the range of letter-sized sheets. FIG. 17 represents a printer 102 which prints such a sheet 104 for the customer responsive to the computer 30. As represented in FIG. 17 the gripper members 74 engage the sheet and remove it from the printer 102. In this exemplary sheet handling process the gripper members engage the sheet such that the sheet has the curved contour in the area of engagement with the gripper members. In this area the sheet has a generally downward contour configuration like that of sheet 100 represented in FIG. 18.

Figure 19:
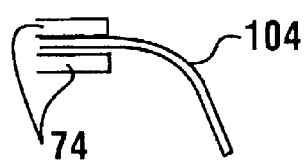
FIG. 19 is a side view of a bent sheet in a generally horizontal position gripped by the gripper fingers.
Figure 20:
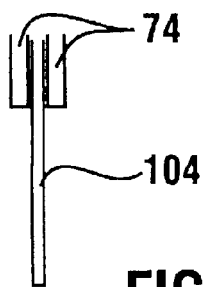
FIG. 20 is a side view of gripper fingers pivoted to a vertical position for straightening a sheet.
Figure 21:
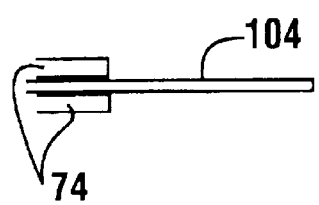
FIG. 21 is a side view of the gripper fingers on the robotic arm pivoted from the position shown in FIG. 20 to a horizontal position wherein the sheet extends generally straight, horizontally.
Figure 22:
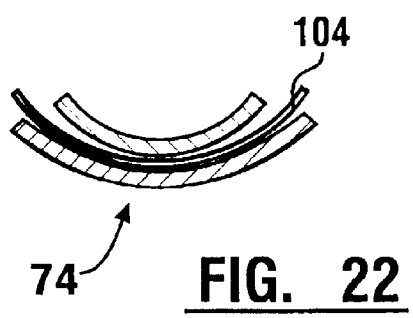
FIG. 22 is a front view of the gripper fingers holding the sheet as in FIG. 21.

A problem with large flexible sheets is that they tend to bend or droop as represented by a sheet 104 in FIG. 19 when held adjacent only one side. In this condition it may be difficult to move such items with high precision with the gripper fingers. The robotic item handling device may fail to place the item in the proper position when such a sheet is deformed due to its limp or bent character. To minimize this problem, the computer 30 of the exemplary embodiment operates the robotic item handling device to move sheet 104 from a position like that shown in FIG. 19 to a generally vertical position like that shown in FIG. 20. From this generally vertical position the gripper fingers are rotated such that the sheet 104 is held generally horizontally and in this example, with a generally upright arcuate cross sectional configuration as represented in FIGS. 21 and 22. With this generally upright arcuate configuration imparted to the sheet, the sheet becomes more rigid. As a result the sheet can be moved and more reliably placed accurately in an appropriate location. By executing this series of maneuvers for generally flexible sheets, more reliable placement of such sheets in a delivery area may be achieved.

Figures 14, 15:
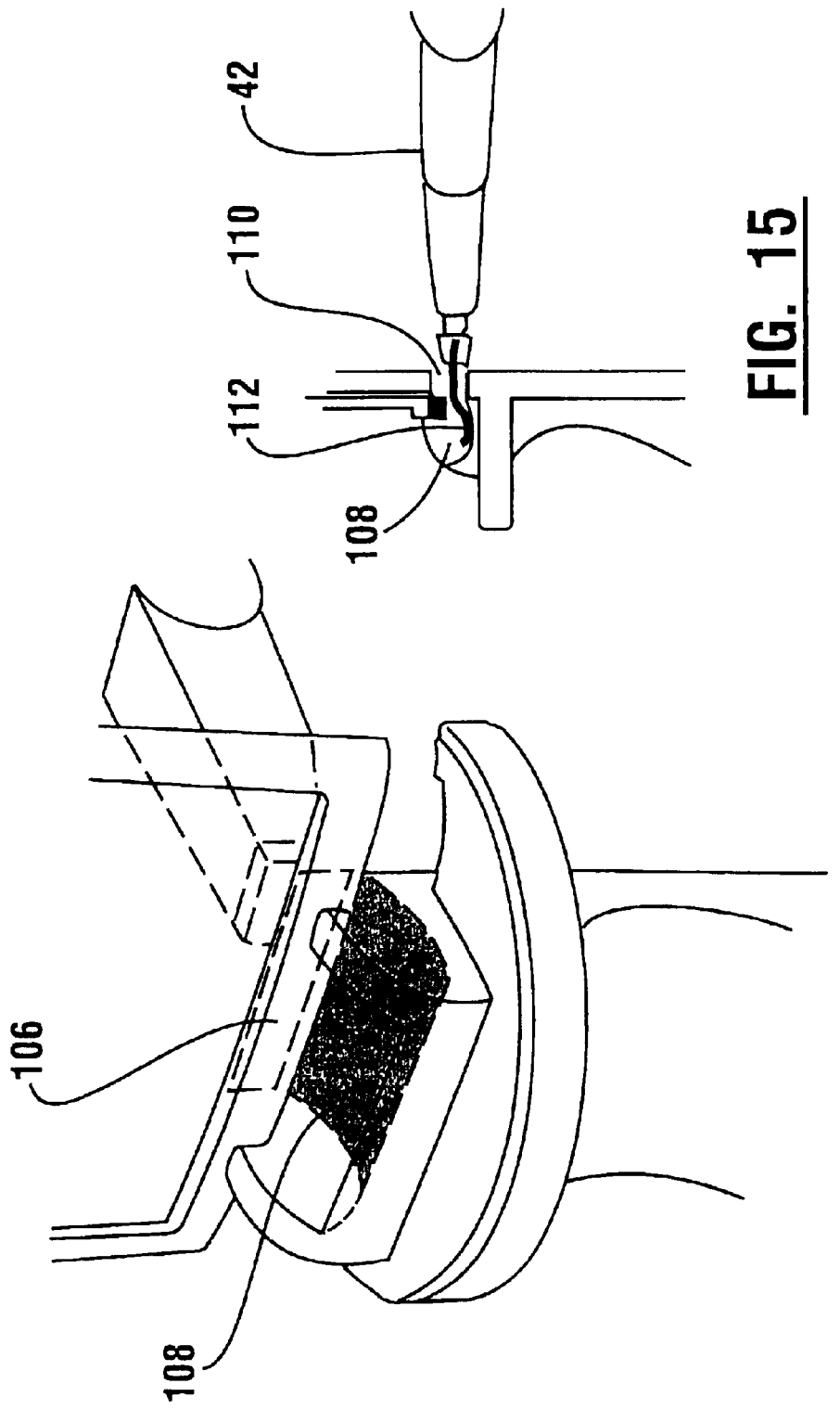
FIG. 14 is an isometric view of an alternative customer station arrangement.
FIG. 15 is a side view of the alternative customer station arrangement shown in FIG. 15.

FIGS. 14 and 15 show an alternative configuration usable to deliver and receive items from a customer which is made more reliable by being able to properly orient the sheet-like items. A customer station 106 shown in FIG. 14 includes a stationary tray or pocket 108. Pocket 108 is in communication with an opening 110 in the housing of the machine. The robotic item handling device 42, by straightening and maintaining the desired configuration of one or more sheets, is enabled to extend such sheets through the opening 110 and into a delivery area of pocket 108, from which the sheets may be taken by a customer. This is represented by a sheet 112 in FIG. 15.

It should be further understood that the orientation of pocket 108 and opening 110 may be sized so that a customer may also present items into the pocket which can be grasped by the gripper fingers of a robotic item handling device. This may be achieved by having the opening 11 sufficiently small so that the gripper fingers may reliably grasp sheet-like or other items that are extended through the opening 110. Alternatively suitable aligning mechanisms such as gates or aligning members may be provided for aligning one or more sheet-like items extended through the opening 110 so that the gripper members may reliably engage such items. Various approaches may be taken depending on the particular type of items to be handled and exchanged with customers through the pocket and the type of gripper members used.

Figure 6:
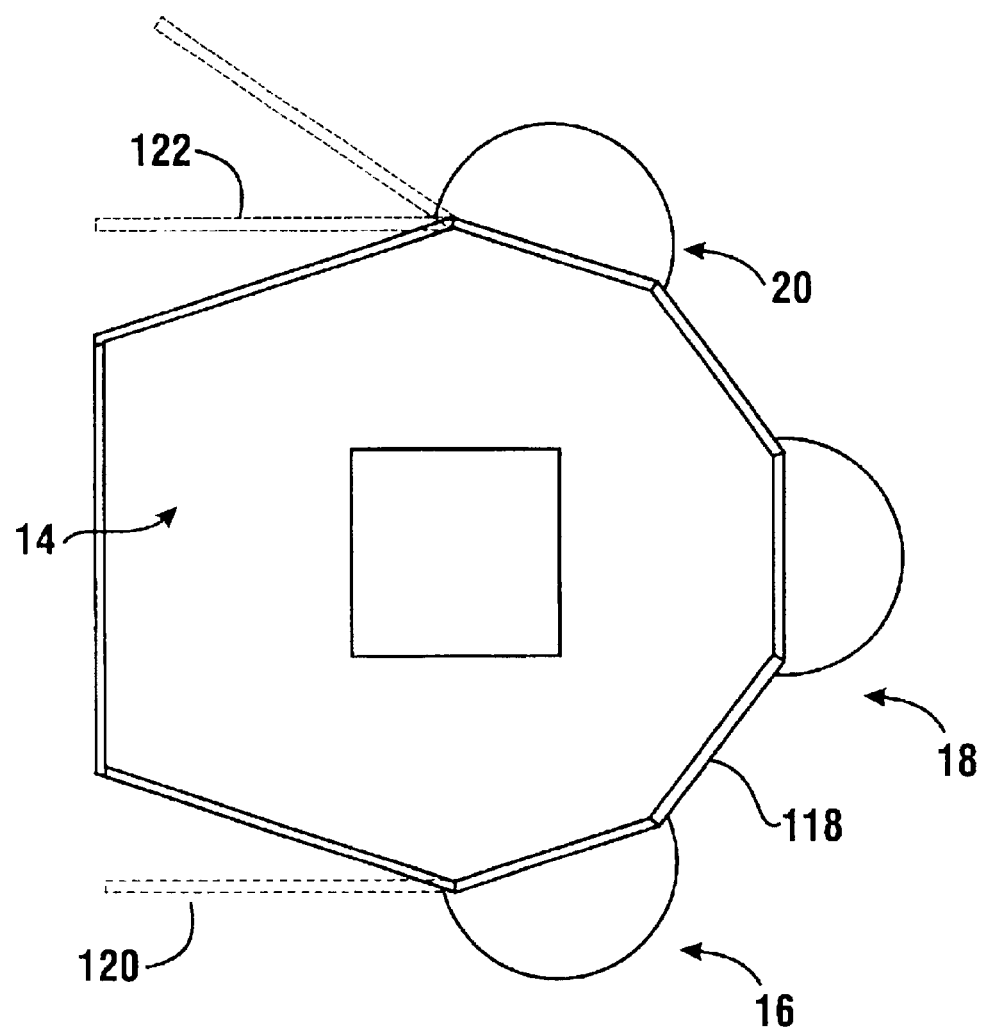
FIG. 6 is a top view of the enclosure structure shown in FIG. 5.
Figure 16:
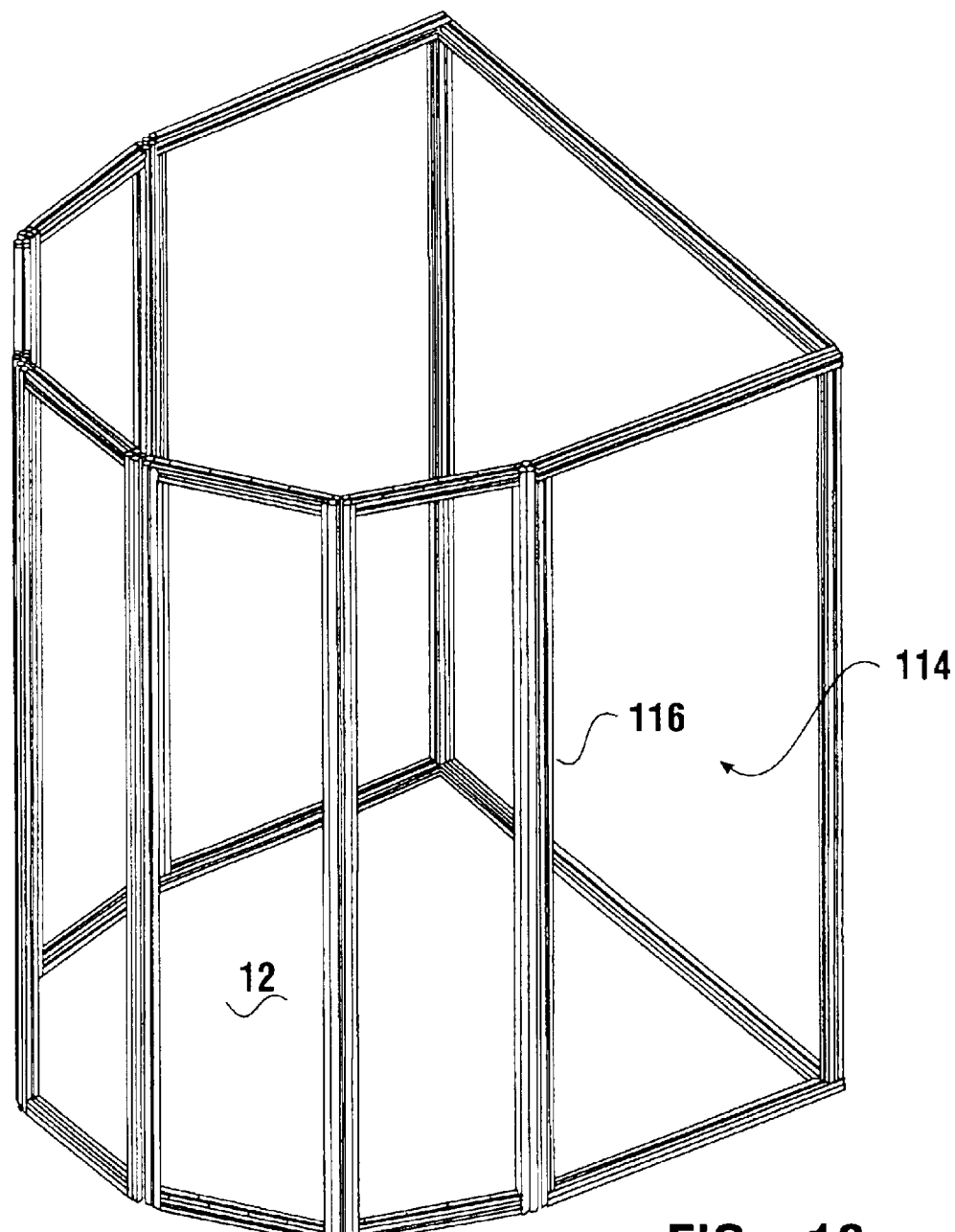
FIG. 16 is an isometric view of a wall arrangement for a housing of an automated banking machine of the present invention.

FIGS. 5, 6 and 16 show exemplary housing structures which may be used in connection with machines of the present invention. As shown in FIG. 16, housing 12 may include a frame 114. Frame 114 includes a plurality of frame members 116 which are joined together in supporting connection with the frame to form the generally seven-sided structure of the exemplary housing 12. As shown in FIG. 5 a plurality of generally rectangular panels 118 are mounted in supporting connection with the frame members 116 for purposes of enclosing the interior area. As represented in FIGS. 5 and 6 in the exemplary embodiment two of the panels 120 and 122 are enabled to be moved in supporting connection with the frame relative to the housing. This may be accomplished through a hinge mounting or other movable mounting mechanisms. Panels 120 and 122 are enabled to be swung outward as shown, a sufficient distance to enable authorized persons to gain access to the interior area 14 of the housing. As will be appreciated, panels 120 and 122 are normally secured in a closed position on the housing by suitable locks schematically indicated 123 or other mechanisms that prevent unauthorized access. However in the exemplary embodiment, authorized personnel are enabled to move the panels and swing them outward to enable servicing of the particular components within the interior area of the machine.

As can be appreciated from the foregoing description, some embodiments of the present invention enable a plurality of transaction function devices to be included within the interior area of the housing. The number and variety of such transaction function devices may be substantially greater than could be conventionally housed within a single conventional ATM. This enables customers operating the machine to carry out more types of transactions.

Embodiments of the invention may also achieve enhanced reliability and longer intervals between servicing compared to conventional automated transactions machines. This is because sufficient room may be available within the interior area of the housing for two or more of the same type of transaction function device. For example if duplicate currency dispensers are included within the housing, the programming of the computer may be operative so that a malfunction or depletion of a primary one of the dispensers will not adversely impact the ability of the machine to carry out transactions. The computer may operate a fallback device which can perform the same transaction function to carry out the particular type of transaction that has been requested by the customer. Similarly, printers, dispensers, depositories and other devices with redundant capabilities relative to other devices in the machine may be provided. Such capabilities may reduce the risk that a customer will find the machine to be unavailable. The computer 30 used in connection with embodiments that include this capability is programmed so that when signals indicate that a particular device is not operating properly, operation of the backup transaction function device is initiated. In such circumstances the computer also adjusts its programming so that the robotic item handling device takes or receives items from the fallback device.

Other devices with overlapping functionality may be used alternatively to carry out a particular transaction function in the same way. For example an exemplary banking machine may include both a note dispenser and a coin dispenser. If the note dispenser becomes inoperative after running out of ten dollar bills, the coin dispenser may be used to dispense dollar coins until the ten dollar bills are replenished.

Figure 27:
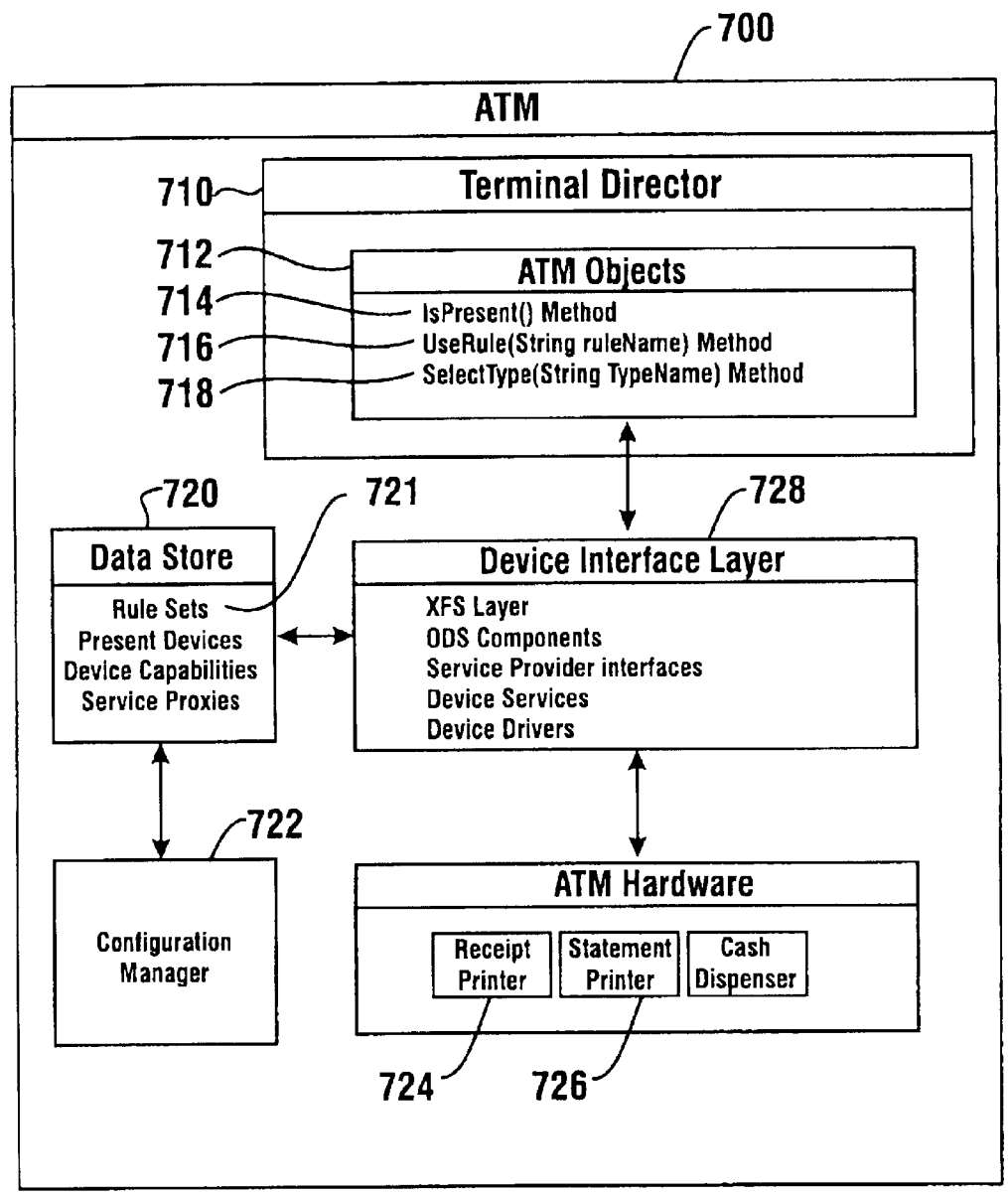
FIG. 27 is a schematic view of an exemplary software architecture that may be used in embodiments of the invention.

FIG. 27 shows a schematic diagram of a programming architecture that is operative to achieve such exemplary fallback functionality. Here one or more computers in an ATM 700 include a terminal director 710 comprised of a plurality of ATM software objects 712. In the exemplary embodiment the ATM objects 712 correspond to Java® beans; however, in alternative exemplary embodiments other types of objects and classes may be used that are appropriate for the hardware and application software platform of the ATM including Active X™ and COMM objects.

In addition to the methods of the ATM objects, each ATM object further includes a plurality of methods or functions related to the capabilities of underlying transaction function devices 724 and 726. These methods include an is-present method 714, a use rule method 716, and a select type method 718. The select type method 718 is operative to specify which type of device of the ATM object is associated therewith. For example, a printer object is operative to communicate with both a receipt printer 724 and statement printer 726 such as shown in the interior area of the enclosure in FIG. 31. The select type method 718 can be used to specify that a particular instance of the printer object corresponds to a receipt printer.

This is-present method 714 is operative to determine if the desired type of device is present in the ATM. This method relates to a terminal software application to be self-configuring with respect to different types of transactions. For example, if an is-present method 714 returns a negative value for a statement printer, the terminal functionality that corresponds to printing statements can be hidden from the users of the ATM. In this manner, the exemplary ATM objects are operative to determine the capabilities of the ATM objects and configure the operation of the ATM responsive to the determined capabilities.

In alternative embodiments of the present invention, methods may be used which include arguments for different types of features of the desired device or service. For example the is-present method or another capabilities method of a printer object could be passed an argument that corresponds to color printing. If a printer with colored inks is present, the printer object can be configured to print multicolored indicia. These exemplary methods enable a single generic type of ATM object such as printer object, to support a plurality of specialized devices, such as a receipt printer, statement printer, thermal receipt printer, color printer, or any other printer device.

The use rule method 716 is operative to specify a set of rules for determining which device an ATM object will initially use, and which device will be used when the current or default device is inoperative. The exemplary embodiment of the present invention includes at least one data store 720 which is operative to store a plurality of such rules sets 721 for the devices in the banking machine. For example the data store may include a default set of rules of a card reader object that specifies that if there is only one card reader device, a card reader object will be automatically connected thereto. If there is more than one printer device, a rule set can be created and used by a printer object that specifies that a receipt printer device is the default printer which is the primary device to be used for printing receipts, and a statement printer device is a fallback printer in cases where the receipt printer device is unavailable such as due to a malfunction.

In the exemplary embodiment, rule sets and their associated devices 724 can be created and saved in the data store 720 by a configuration program 722 in operative connection with the data store 720. Such a configuration program 722 is also operative to store data representative of which devices are currently installed in the ATM. The configuration program is further operative to store in the data store 720 specific features that are associated with each device. The results of the is-present method 714 can be determined by querying the data store 720 for the corresponding type of device and/or feature of the device.

In an alternative embodiment, where individual devices include self configuration features, such as Sun Microsystems JINT™ and Microsoft® Universal Plug and Play™, individual devices 724 themselves may be operative to upload details of their features and/or corresponding service proxies to the data store 720.

The exemplary ATM 700 further includes a device interface layer 728. The exemplary device interface layer 728 may be comprised of a plurality of ODS (Open Data Services). In addition the device interface layer 728 may be comprised of one or more device API layers such as a J/XFS (Java/eXtensions for Financial Services) kernel or a WOSA/XFS (Windows Open Service Architecture/eXtensions for Financial Services) manager. These components and layers of the device interface layer 728 are operative to provide an interface between the ATM objects 712 and corresponding hardware devices 725 and 726.

In one exemplary embodiment of the present invention, the ODS components and/or the XFS components are operatively programmed to provide an interface between the ATM objects 712 and the data store 720 for determining which devices and features of devices are present in the ATM. The device interface layer 728 is further operative to process rules in the data store 720 for determining defaults or primary devices and the order of fallback devices for performing a particular transaction function. Responsive to the information associated with rules, present devices, and device capabilities stored in the data store 720, the device interface layer 728 is operative to have each ATM object 712 communicate with a device 724 that includes the appropriate capabilities required by the ATM object.

Figure 28:
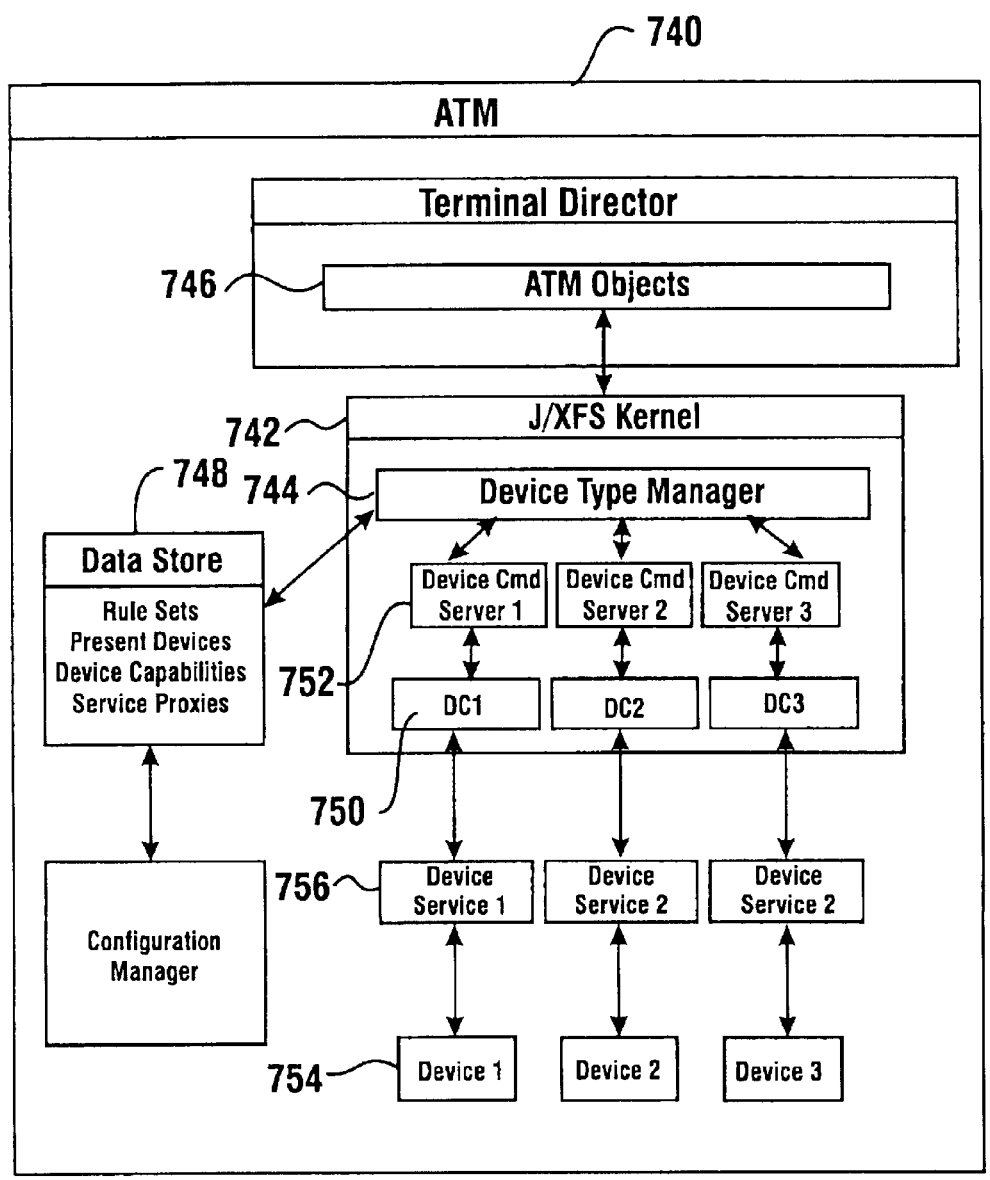
FIG. 28 is a schematic view of an alternative software architecture that may be used in embodiments of the invention.

FIG. 28 shows an exemplary embodiment of an ATM 740 that includes a device interface layer comprised of an enhanced J/XFS kernel 742. The J/XFS kernel 742 includes a device type manager 744. The device type manager 744 is operative to communicate with a plurality of ATM objects

746 and crate corresponding instances of device control objects 750 responsive to the rule sets selected by the ATM object. The rule sets are retrieved from a data store 748 in operative connection with the device type manager. The device controls 750 are operative to control the operation of ATM devices 754 through communication with device services 756 (i.e. device drivers) according to the J/XFS specification. The device controls 750 generally correspond to device services. Messages between the device type manager 744 and the device controls 750 are queued by device command servers 752 which generally correspond to the device controls 750.

The device type manager 744 routes messages to the correct device command server 752 responsive to the rule sets in the data store 748. The device type manager 744 is further responsive to a rule set to switch to the next appropriate device command server 752 if the health of one of the current devices 754 becomes inoperative.

Figure 29:
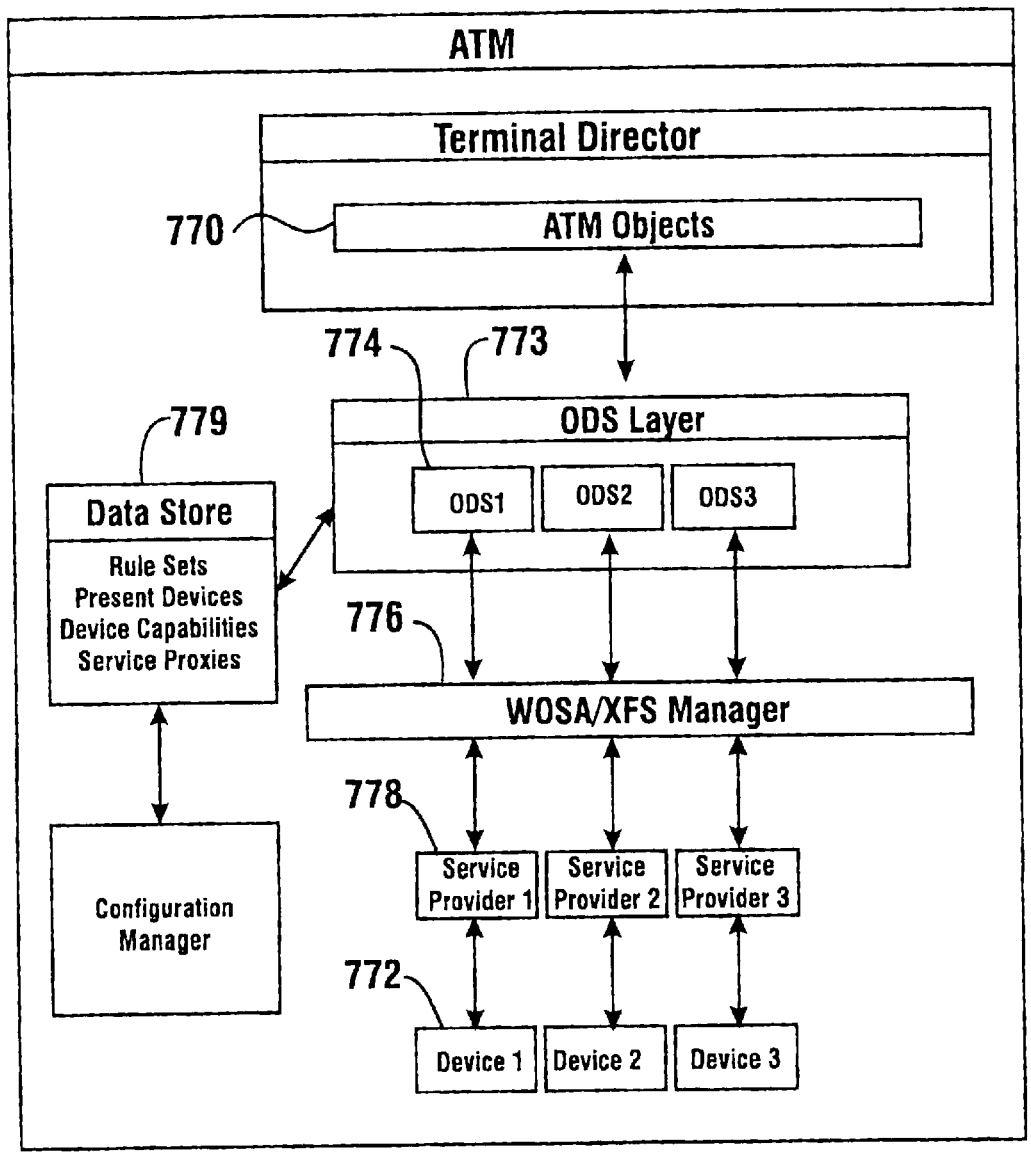
FIG. 29 is a further alternative embodiment of a software architecture that may be used in embodiments of the invention.

FIG. 29 shows another exemplary embodiment of software architecture that may be used in embodiments of the present invention. Here the ATM objects 770 are operative to control the operation of devices 772 through communication with ODS components 774. ODS components 774 are designed to abstract the differences between inconsistent vendor implementations of service provider interfaces 778 (i.e. device drivers) beneath a consistent and uniform interface. In this described exemplary embodiment the ODS components 774 control the operation of the devices 772 through communication with a WOSA/XFS layer 776. The WOSA/XFS layer 776 in turn communicates with the devices 772 through the service provider interfaces 778. Service provider interfaces are typically provided by the supplier of the particular hardware device to facilitate use in an open software environment. In this described exemplary embodiment the ODS layer 773 has been enhanced to include the previously described functionality of the device interface layer. Thus the exemplary ODS components 774 are operative to communicate with the data store 779 to provide capability information to the ATM objects 770. The ODS components 774 are also operative to process rules sets for determining which service provider interfaces and devices are to be used initially and which are to be used as fallback devices when the default devices become inoperative.

Figure 30:
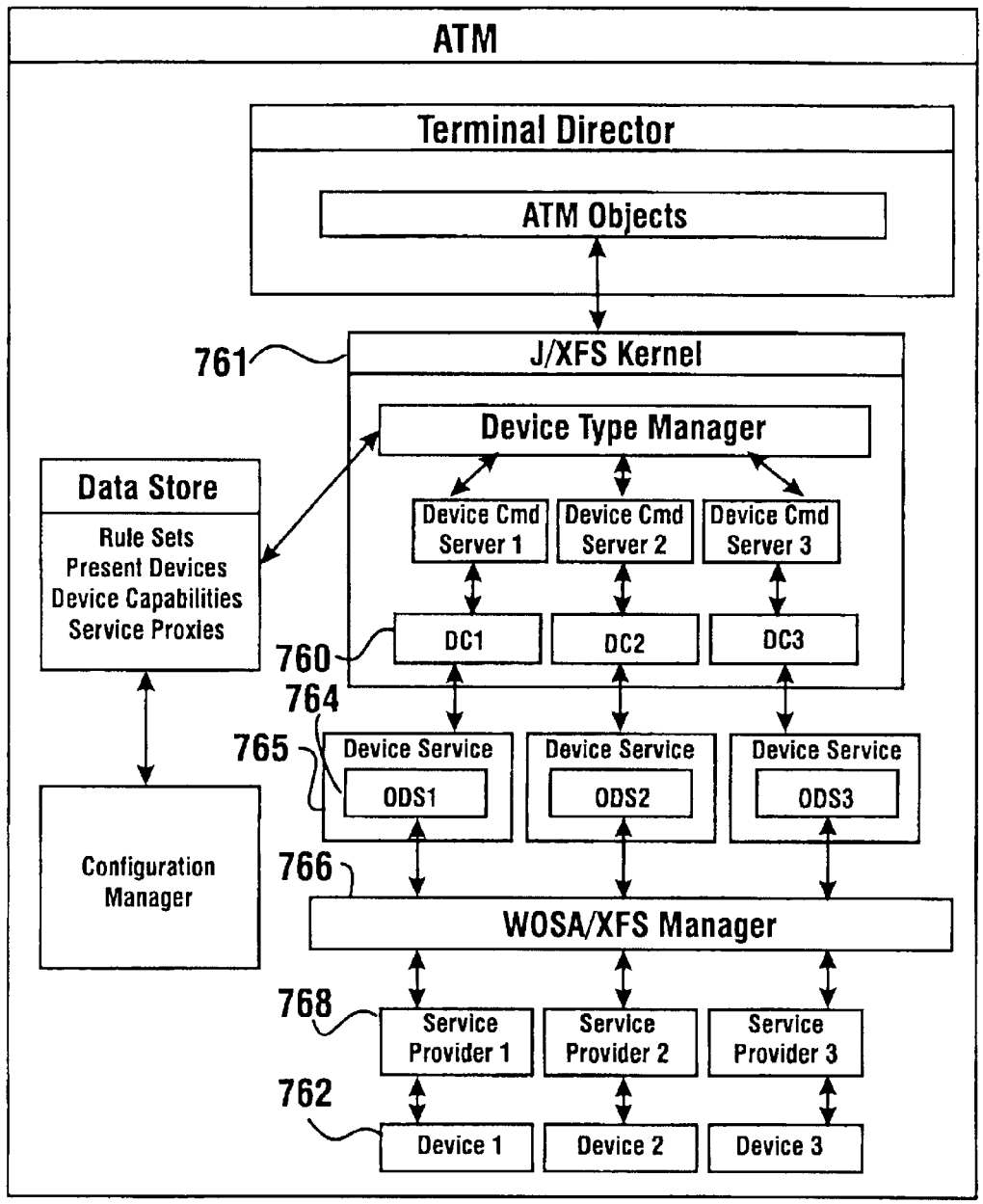
FIG. 30 is a schematic view of a further alternative software architecture that may be used in embodiments of the invention.

FIG. 30 shows another exemplary embodiment of software architecture that may be used in embodiments of the present invention. Here the device controls 760 of the J/XFS layer 761 are operative to control the operation of devices 762 through communication with ODS components 764. As discussed previously the ODS components 764 control the operation of the devices 762 through communication with a WOSA/XFS manager 766. The WOSA/XFS manager communicates with the devices 762 through the vendor provided service provider interfaces 768. For ODS components that are comprised of C, C++, COMM, or other non-Java components, the present exemplary embodiment encompasses placing a JNI (Java Native Interface) wrapper around the ODS components 764 to form the J/XFS compatible device services 765. The device services 765 provide an interface for the Java based J/XFS layer to communicate with the ODS components 764 and the Windows® based WOSA/XFS manager 766.

Computer software used in operating the automated banking machines of embodiments of the present invention and connected computers may be loaded from articles of various types into the respective computers. Such computer software may be included on and loaded from one or more articles such as diskettes or compact disks. Such software may also be included on articles such as hard drives, tapes or read-only memory devices. Other articles which include data representative of the instructions for operating computers in the manner described herein are suitable for use in achieving operation of automated banking machines and systems in accordance with embodiments of the present invention.

A further advantage of exemplary embodiments of the invention is that significantly larger amounts of supplies may be contained within the banking machine housing. Such supplies may include large rolls of paper, large magazines of ticket stock, large supplies of notes, or other items or media needed to operate the machine. This further increases the time that the machine may be operated without servicing. Alternative embodiments of the invention may also be programmed such that the robotic item handling device is enabled to load selected types of media or items from storage areas in the housing into devices when such devices approach or reach the point of depletion.

As previously discussed, the exemplary embodiment of the invention enables the transaction function devices to be arranged in various locations within the interior area of the housing. Such devices may be mounted in supporting connection with floor surfaces or wall surfaces. Such devices may also be arranged horizontally and vertically on shelves, in racks and/or mounted on top of other devices. The transaction capabilities of the machine may also be changed by adding or removing transaction function devices from the interior of the housing. As a result, changing transaction capabilities in greatly simplified compared to conventional ATMs.

As previously discussed, in some embodiments of the invention some transaction function devices may have the capability of automatically reconfiguring the programming of the system so as to enable the operation of such new devices in coordination with existing devices. This may be done for example in the manner disclosed in International Publication No. WO 0049547 published Aug. 24, 2000 which is owned by the assignee of the present invention, the disclosure of which is incorporated herein by reference as if fully rewritten herein. In exemplary embodiments of such systems, the automated banking machine is comprised of a plurality of transaction services. Such transaction services are collections of software or hardware and software that have the properties of objects. Such transaction services have the capability of automatically configuring and communicating through object method calls when the transaction services are placed in operative connection with a controller in the machine and/or with one another. Examples of software systems which provide such capabilities include Sun Microsystems JINI™ and Microsoft Universal Plug and Play™.

In an exemplary embodiment a transaction service includes a hardware transaction function device such as a printer 127 shown in FIG. 31. The printer, because it is a part of a transaction service, includes in operative connection therewith at least one processor schematically indicated 125. The processor is in operative connection with a data store schematically indicated 129. The data store maintains in memory therein a software application such as a Sun JINI™ application as previously discussed which enables the printer 127 to automatically be configured and integrated into a banking machine system upon being operatively connected thereto. The transaction service which includes the hardware and software associated with the transaction function device first carries out the processes of discover and join as described in the manner of the incorporated disclosure. Then once the transaction service has joined as part of the system, the transaction service including the transaction function device will run in coordination with the other devices. In order to run the transaction function device the associated transaction service will acquire from a lookup service in the machine and download, a service proxy that will run in the JAVA virtual machine of the calling service. Thus in the exemplary JINI architecture, the software components including the software application as well as transaction function devices, are each associated with a respective transaction service. Each service has access to the service proxies of the transaction services that it communicates with. This includes the transaction service which includes a software application which operates devices in the machine. Thus in the exemplary embodiment the capabilities of the automated banking machine may be changed by connecting and removing transaction services and their associated transaction function devices from the machine.

As can be appreciated in the exemplary embodiment, in order for the robotic item handling device 42 to accurately move items between the delivery areas and the transaction function devices, the data stored in connection with the system must include information concerning the physical locations of the respective transaction function devices. In some embodiments this may be programmed into the system by using input devices and references to a particular imposed coordinate system. Alternatively, location for transaction function devices may be programmed by moving robotic item handling devices in a manually controlled mode to those locations on the transaction function devices at which the gripper fingers are required to engage items to be handled in the course of transactions. Once the gripper fingers have been manually moved to the proper positions, data corresponding to these positions may be stored in one or more data stores to enable the machine to engage and release transaction items at the appropriate locations.

In other alternative embodiments robotic item handling device 42 may have one or more sensors in operative connection therewith. Such sensors are represented schematically in FIG. 31 by a sensor 107. Sensor 107 may be one or more of a plurality of different types of sensors depending on the requirements of the system. The one or more sensors 107 communicate with or sense a location indicator and a device type identifying indicator associated with each transaction function device. In FIG. 31 the location indicator associated with printer 127 is indicated 131 and the device type identifying indicator is indicated 133. It should be understood that although in the exemplary embodiment the indicators are represented as separate items, in some embodiments such indicators may be combined into a single indicator.

In an exemplary embodiment the location indicator is operative to indicate to the one or more sensors 107, the particular location or orientation of the particular transaction function device. Such location indicators may include one or more reflective, infrared, laser or other suitable indicator, that is capable of being sensed, and which when sensed by the one or more sensors 107, can be used by the controller to accurately guide the gripper fingers on device 42 to engage a particular transaction item or portion thereof that is required to be received from or delivered to a particular transaction function device.

The device type identifying indicators in the exemplary embodiment are read by the one or more sensors in order to identify a particular transaction function device, or in some embodiments the particular type of transaction function device. In exemplary embodiments of the invention, the device type identifying indicators may include infrared emitters, machine readable indicia, R/F backscatter type emitters or other indicators which are capable of being read so as to indicate the particular type of device and/or characteristics of the device, so that the sensors can verify the particular device from among the plurality of transaction function devices which make up the machine.

In an exemplary embodiment the controller may operate such that the one or more sensors 107 read the location indicators and device type identifying indicators for all the transaction function devices in the machine. The information concerning each of the transaction function devices is correlated through operation of the controller with the software architecture information concerning the numbers and types of devices connected in the machine. A controller then operates the robotic item handling device 42 in accordance with the stored information so as to move items between the delivery area and the transaction function devices, as well as between transaction function devices. In other embodiments, the controller may operate so that the identifying information and/or location information is verified with each use of a transaction function device or with each transaction. In other alternative embodiments the controller may be operative upon each transaction to scan location and/or identification information so as to locate a particular transaction function device including any newly added device, with each transaction. As can be appreciated, various approaches to coordinating the operation of the one or more robotic item handling devices with the transaction function devices in the machine may be used in embodiments of the invention.

Figure 7:
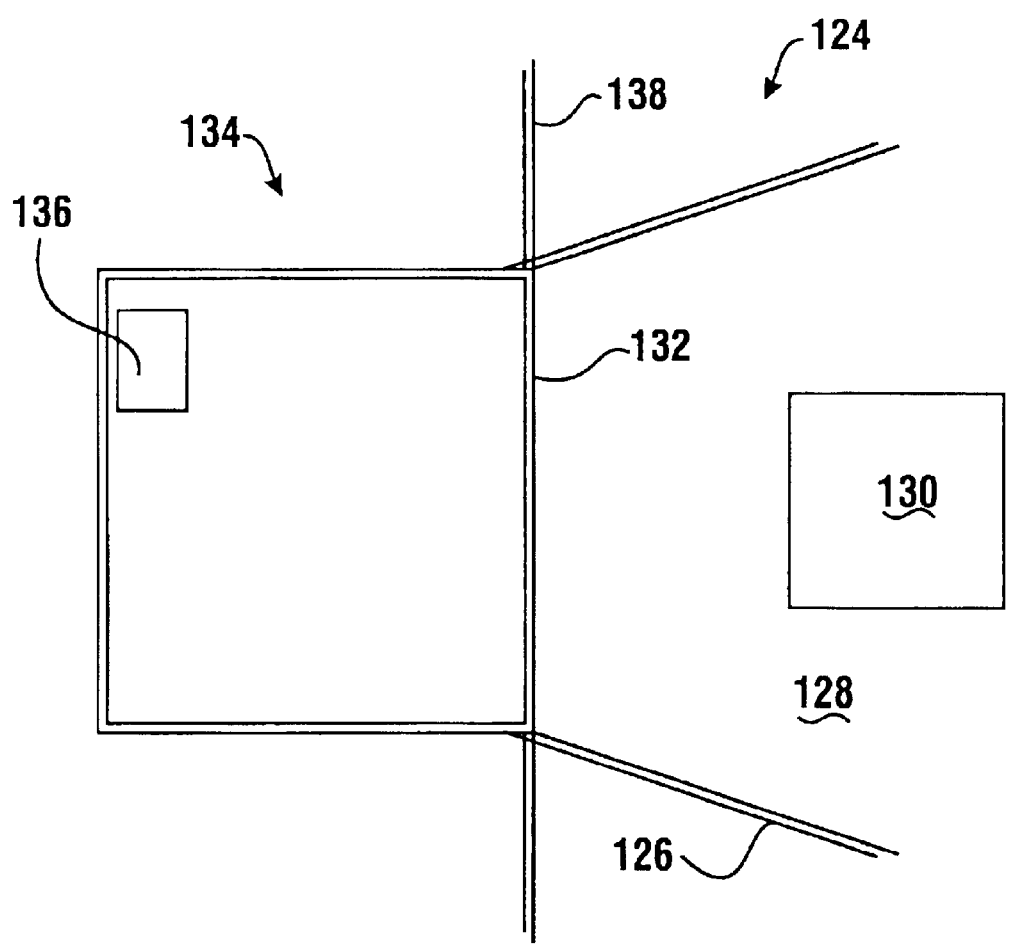
FIG. 7 is a top view of an enclosure of an automated banking machine.
Figure 8:
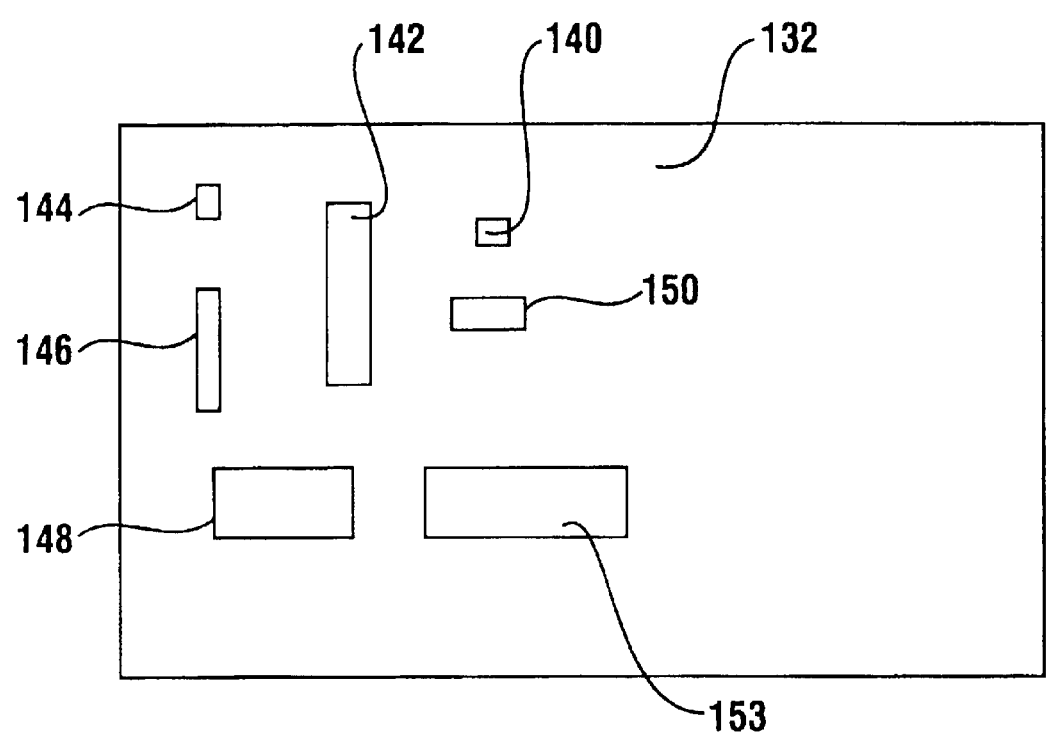
FIG. 8 is a schematic view of a plurality of transaction function devices, openings or mechanisms providing access thereto.

FIGS. 7 and 8 schematically represent a further alternative embodiment of an automated banking machine of the present invention. In this embodiment a machine 124 is provided which is generally similar to machine 10. Machine 124 includes a housing 126 which generally surrounds an interior area 128 of the machine. Interior area 128 includes a robotic item handling device similar to that previously discussed.

Unlike the previously described embodiment, machine 124 includes only a limited number of transaction function devices within the interior area 128. In this embodiment interior area 128 is bounded by a rear wall surface 132. Wall surface 132 may include a surface of a secure room or enclosure 134. Secure enclosure 134 may be a concrete, steel or other secure chest which only authorized personnel are enabled to access. Secure enclosure 134 may include a plurality of transaction function devices such as sheet dispensers, depositories, ticket printers and other devices. Secure enclosure 134 may also include one or more computers 136 which are used to operate the machine. In some embodiments secure enclosure 134 may be built into a wall such as wall 138. Wall 138 could be an exterior or interior building wall. Alternatively, secure enclosure 134 may be free standing.

As shown in FIG. 8 wall 132 of secure enclosure 134 includes a plurality of access openings or access mechanisms schematically represented 140, 142, 144, 146, 148, 150 and 153. Such openings and access mechanisms provide passages and transports through which items such as sheets, depository envelopes, tickets and other items may be passed between the interior of the secure enclosure 134 and the inner area 128 of housing 126.

In operation of machine 124 the robotic item handling device 130 operates to move items between the delivery areas of the customer stations and the openings and access mechanisms positioned on wall 132. Because secure enclosure 134 provides enhanced protection it becomes more difficult for unauthorized persons to gain access to valuable documents, currency, ticket stock or other items which may be dispensed or received by the machine. Of course it should be understood that various allocation of transaction function devices may be made between the secure enclosure and the interior of the housing. In other embodiments the secure enclosure may be positioned within the interior area of the housing in the manner of the smaller secure compartments and chests discussed in connection with the previously described embodiment. For example and without limitation, robotic item handling devices may be positioned on top of or adjacent to the access mechanisms and openings so as to enable the proper movement of items into and out of a secure chest. Numerous alternative embodiments may be produced within the scope of the present invention.

In operation of the embodiment of the invention shown in connection with FIG. 1, the transaction function devices 34 are operatively connected to the computer 30 through appropriate interfaces. Likewise the robotic item handling device is connected to the computer through an appropriate interface. Sensors are also positioned adjacent to certain of the transaction function devices including on the gripper members, trays, and adjacent other devices to monitor the operation thereof. The outputs from the sensors are routed through appropriate interfaces to the computer as well.

The computer is programmed to carry out various transactions which may be requested by users. In the exemplary configurations previously discussed, the programming includes the information necessary for the robotic item handling device to locate areas on the transaction function devices from which items are to be taken and/or into which items are to be deposited. The programming also includes the data necessary for the robotic item handling device to move to locations for the tray mechanism and other devices used to input and deliver items at the customer station.

In the exemplary embodiment the programming of computer 30 also includes the information necessary for the computer to communicate with remote computers for purposes of authorizing transactions and for making appropriate additions and deductions from accounts. The programming further includes the data necessary to provide instructions and prompts from the output devices as the customer stations. The capability to recognize the various input instructions from users is also programmed into the machine.

Additional information stored in the data store may include presentation materials which are to be presented to customers, the logic associated with selecting such presentations and the timing during the carrying out of transactions at which presentations are to be presented. Of course other information and logic may be programmed in connection with the computer 30 depending on the requirements of the particular system.

An exemplary form of the system is enabled to carry out a plurality of actions by the transaction function devices simultaneously. This may be accomplished in a manner disclosed in published International Application No. PCT/US98/24671, and/or in U.S. Pat. No. 6,131,809 the disclosures of which are incorporated by reference herein.

In an exemplary transaction, a customer approaching the machine 10 identifies themself or their account to the machine. This is done in the exemplary embodiment by the user presenting a magnetic stripe card to the card reader 24 and thereafter providing an input of a PIN. The PIN may be input in response to a display or visual representation of a keypad on the touch screen or through the fixed keypad, keyboard or other input device. Responsive to prompts from output devices caused by operation of the computer, the customer also provides inputs to select a type of transaction and an amount, a quantity of other information which is indicated of the value involved in the transaction.

Responsive to the inputs provided by the customer, the computer operates to determine if the transaction is authorized. For purposes of this example it will be presumed that the customer has requested a withdrawal of cash from an account using a debit card. The computer 30 communicates with an appropriate host computer which is in communication with a data store containing information concerning the account identified on the customer's card. If the customer has the funds available and the card has not been made inoperative because it has been reported stolen or otherwise disabled, the host computer returns an authorization message to the machine 10 indicating that the transaction is authorized. If for some reason the transaction is not authorized, the return message includes data representative of this fact.

If the transaction is not authorized the computer 30 operates in accordance with its programming to advise the customer through an output device that the transaction cannot be carried out. The computer then operates to return the card to the customer and to close the transaction.

If the transaction requested by the customer is authorized the computer operates responsive to the authorization message to cause a currency dispenser within the housing to dispense the number of notes corresponding to the amount of funds requested by the customer. The computer further operates responsive to appropriate sensors or data stored in memory to determine whether the tray 78 associated with the tray mechanism 28 is in the retracted position. If the tray is not retracted, the computer operates the robotic item handling device 42 to move the tray to the retracted position.

The computer next operates to cause the gripper fingers 74 to move to engage the notes dispensed by the note dispensing device. Sensors associated with the gripper fingers sense that the gripper fingers have engaged the dispensed notes. These may include contact sensors, optical sensors or other suitable sensors which are in operative connection with the controller. The computer next operates to cause the robotic item handling device to move the notes over the delivery area 80 of the retracted tray. The gripper fingers then move downward into the opening 86 in the separating member 84 such that the notes are positioned on the outboard side of the separating member. The computer next operates to separate the gripper fingers 74 and to move the gripper fingers in an inboard direction in the opening 86. This causes the notes to be disengaged from the gripper fingers and to be deposited in the delivery area of the tray 78.

The computer operates to cause a receipt printer to print a receipt for the transaction. The computer causes the robotic item handling device to move the gripper fingers to engage the receipt and to move the receipt into the delivery area of the tray 78 in a manner similar to that done for the notes. The computer then causes the gripper fingers to move the tray 78 outward by moving the actuating member 82. Sensors positioned in or adjacent to the tray sense that the tray has moved outward and when the customer has removed the notes and receipt therefrom.

The computer then operates to provide a prompt to the customer to provide an input indicative of whether the customer wishes to conduct another transaction. Assuming that the customer provides an input declining a further transaction, the computer then operates to close the session. This is done by returning the customer's card from the card reader. In addition the computer operates to send a confirmation message to the host computer that authorized the transaction, to confirm that the requested transaction was successfully carried out. In this way the host computer is informed that it is appropriate to debit the customer's account for the funds the customer requested.

The computer 30 may also operate to provide the customer with promotional or other materials at appropriate times before, during or after the transaction. It should also be understood that the computer may operate at various times during the transaction to capture images of the customer through a camera device and to store such image data in a local or remote data store. This provides the capability of verifying the identity of the person who conducted the transaction should there be an issue at a later time. Such image may be captured locally and made available to authorized persons either at the machine or remotely through a network connection. This may be done in embodiments of the invention through use of an AccuTrack™ System which is commercially available from Diebold, Incorporated.

If during the course of performing a transaction for a customer at one customer station another customer initiates a transaction at another customer station, the machine of the exemplary embodiment operates to carry out both transactions concurrently. The computer operates the transaction function devices and the robotic item handling device to move items appropriately between each customer and the transaction function devices. In the operation of the computer, the computer resolves particular results and instructions which are queued, sequenced or otherwise arranged so that the next step in each transaction is carried out at the earliest available opportunity. In this way, multiple customers are serviced by the single machine.

As previously discussed, embodiments of the invention may also initiate two-way audio and video conferencing between customers and service providers. This may be done by a customer at one customer station while other customers are carrying out transactions which do not include the involvement of a human service provider. Similarly embodiments of the invention may include a pneumatic tube conveyor type device through which a customer may exchange items with a human service provider or other device performing system. In such embodiments the pneumatic tube conveyor has an appropriate receiving and delivery device within the interior of the housing of the machine such as mechanism 43 shown in FIG. 24. The pneumatic device may move items in a carrier that is moved between the housing and a service provider station. The computer may operate the robotic device to remove items from the pneumatic carrier and present them to the customer as well as to receive items from the customer and place them in the carrier. Again as previously described one or more customers at customer stations may be carrying out transactions involving exchanges of physical items with a human service provider while other customers are carrying out totally automated transactions. As can be appreciated numerous variations and combinations of transactions may be carried out using embodiments of the invention.

While the exemplary embodiment has been described in connection with an automated banking machine which carried out banking type transactions, the principles of the invention are equally applicable to other types of transactions and systems. For example embodiments of the invention may be used in connection with dispensing pharmaceuticals to authorized users. Such users may include doctors, nurses or other medical professionals, or alternatively patients who obtain and pay for prescribed medications through a self service terminal. The housing may include a plurality of medical items therein along with appropriate dispensers and labeling devices. The robotic item handling device may be operated in accordance with the programming of one or more associated computers to achieve the dispense of medical items, label them and deliver them to the user. In cases where the machine is operated by a medical professional, inputs provided identify the user as authorized to operate the machine and indicate the appropriate patient or department to whom the medical items may be charged. In cases where the terminal is operated as a self service dispenser the patient may use a credit card, debit card or other device to identify themselves or their accounts to the machine.

Machines of the present invention may also find application in fields such as gaming, check cashing, bill payment and numerous other situations. Forms of the invention may include housings or vestibules of varying sizes. Embodiments of the invention may also be configured to be positioned within the interior of the building or in an outdoor environment. Embodiments of the invention may further include user interfaces for either walk-up or drive-up applications. As can be appreciated, embodiments of the invention may include user interfaces at various heights both in drive-up and walk-up applications. Such user interfaces in a walk-up environment may include a user interface suitable for persons in wheelchairs and persons of varying heights. Likewise in a drive-up application, interfaces may be provided for persons conducting transactions from low sports cars to taller trucks and sport utility vehicles. As the same transaction function devices generally fulfill the transaction requests at any of the user interfaces, providing such multiple interfaces does not present a significant additional cost as it may in situations where multiple transaction machines are provided. Numerous other and additional advantages of the present invention will be apparent to those having skill in the art.

Figure 32:
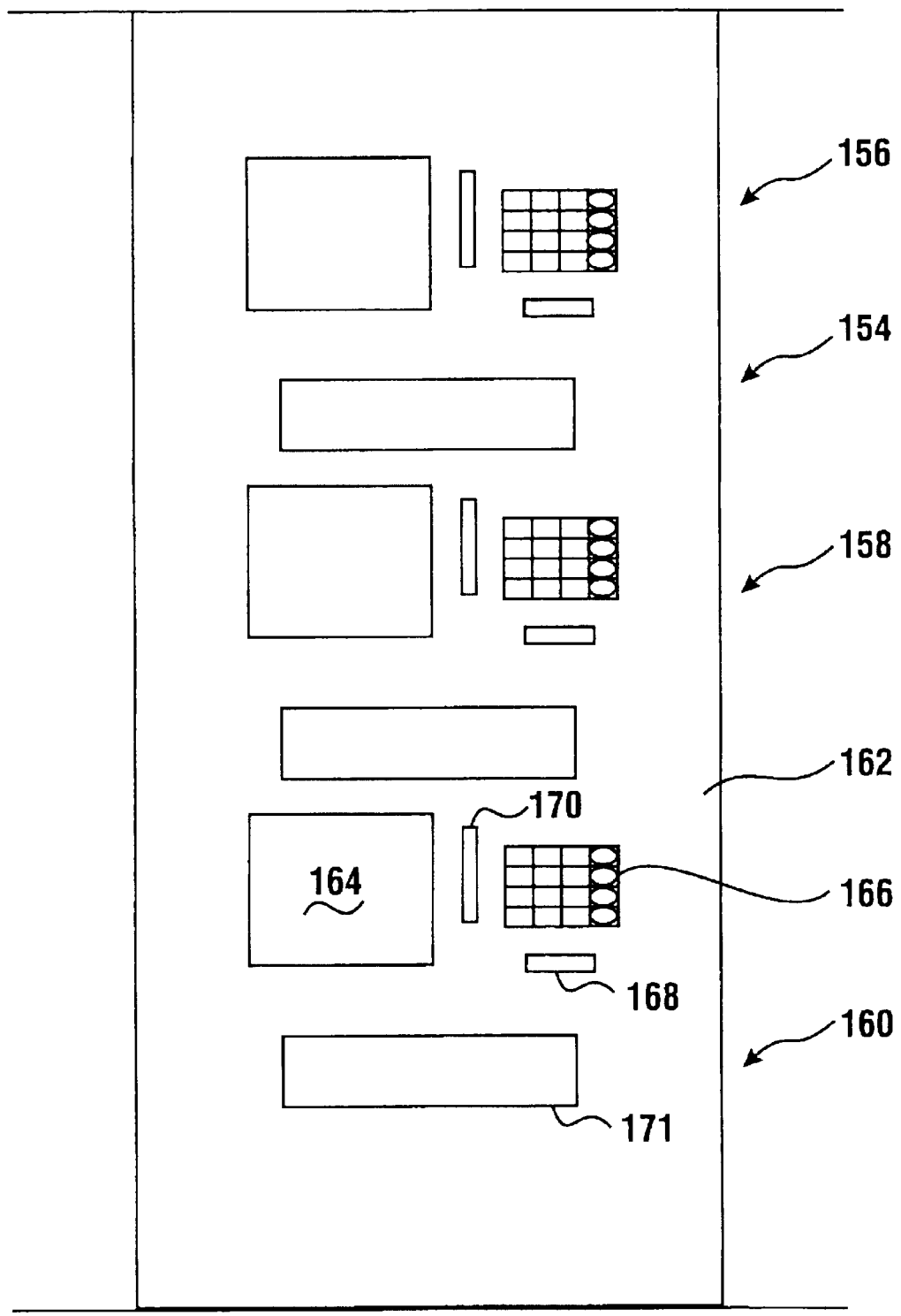
FIG. 32 is a front plan view of a customer panel of an automated banking machine including a plurality of vertically aligned user interfaces such as may be used in a drive-up environment for servicing customers in vehicles of varying heights.

For example, FIG. 32 shows a front plan view of a further exemplary automated banking machine indicated 154. Machine 154 is configured for a drive-up type application. However, the principles of this embodiment may be applied to other configurations of automated banking machines as well. Machine 154 includes three user interfaces 156, 158, and 160. The user interfaces are vertically disposed from one another and vertically aligned on a fascia panel 162.

In this exemplary embodiment the user interfaces are the same and only user interface 160 will be described. User interface 160 includes input and output devices which perform functions similar to those previously discussed in connection with other embodiments. In this exemplary automated banking machine the output devices include a display screen 164. Display screen 164 may be a multi-character line LCD display, LCD panel display, CRT display, or other output device. User interface 160 also includes a keypad 166. In the exemplary embodiment keypad 166 includes alphanumeric keys such as those found on a touch tone phone as well as function keys through which a user is enabled to provide inputs.

User interface 160 further includes a card slot 168. In this exemplary embodiment card slot 168 is sized for accepting a standard sized card such as a credit card or debit card, or alternatively in some embodiments a smart card. User interface 160 also includes a vertically extending media slot 170. Media slot 170 in some environments may be similar to slot 98 previously discussed. User interface 160 also includes a tray mechanism 171. Tray mechanism 171 may be like tray mechanism previously discussed which are enabled to move so that a delivery area is selectively positioned either within the housing or outside of the housing so that its contents may be accessed by a user. Of course it should be understood that these components of each user interface are exemplary and in other embodiments other or additional components may be used.

In the operation of machine 154 a user actuating the machine approaches in a vehicle. The vehicle may be of various heights. Such vehicle heights may make different interfaces more convenient for use depending on which is most closely positioned in adjacent relation with the driver's window. In operating the machine a user inserts their card into the card slot of the user interface that they wish to use. Insertion of the card through the card slot is sensed by appropriate sensors adjacent thereto.

In response to sensing a card inserted through a corresponding one of the card slots, the controller is operative to carry out the transaction through the particular user interface selected by the customer. In an exemplary embodiment the robotic handling device is operative to grip the card and take it from the card slot. The card is then passed through a single card reading transaction function device that is positioned in the machine. It should be understood that although the exemplary embodiment enables the use of a single card reader within the enclosure, other embodiments may include separate card readers accessible through the panel 162. These may include for example, swipe type readers or dip type card readers.

The controller then operates to carry out the transaction by presenting appropriate messages on the display of the user interface selected and receiving inputs through the corresponding keypad or other input devices. Transaction items are exchanged through the tray mechanism corresponding to the user interface selected. In this way the automated banking machine 154 is enabled to readily accommodate carrying out transactions for users in vehicles which position users at various heights with respect to the machine.

It should be understood that although the exemplary machine 158 shows user interfaces vertically aligned and a machine developed for a drive-up application, the principles of this embodiment may be applied to other types of machines. This includes kiosk type environments where user interfaces may be disposed at various heights while being horizontally disposed from one another. In this way persons in wheelchairs or persons having widely varying heights may be more readily enabled to carry out transactions.

Thus the automated banking machine apparatus and system of the present invention achieve one or more of the above stated objectives, eliminate the difficulties encountered in the use of prior devices and systems, solve problems and attain one or more of the desirable results described herein.

In the foregoing description certain terms have been used for brevity, clarity and understanding, however no unnecessary limitations are to be implied therefrom because such terms are used for descriptive purposes and are intended to be broadly construed. Moreover the descriptions and illustrations herein are by way of examples and the invention is not limited to the details shown and described.

In the following claims, any feature described as a means of or performing a function shall be construed as encompassing any means known to those skilled in the art to be capable of performing the recited function, and shall not be deemed limited to the particular features shown herein or mere equivalents thereof.

Having described the features, discoveries and principles of the invention, the manner in which it is constructed and operated and the advantages and useful results attained; the new and useful structures, devices, elements, arrangements, parts, combinations, systems, equipment, operations, methods and relationships are set forth in the appended claims.

We claim:

1. A method including:
   (a) gripping a flexible sheet using a gripper member in an automated banking machine apparatus, wherein the gripper member includes a generally arcuate cross sectional configuration, wherein the gripping produces a generally arcuate cross sectional configuration in at least a portion of the gripped sheet,
   (b) moving the gripped sheet and the gripper member.

2. A method including:
   (a) gripping a flexible sheet with a gripper device in an automated banking machine apparatus, wherein the gripper device includes a plurality of gripper members, wherein at least one of the gripper members includes an arcuate cross sectional configuration, wherein the gripping includes contacting the flexible sheet with the at least one gripper member including an arcuate cross sectional configuration, at least a portion of the gripped sheet,
   (b) moving the gripped sheet and the gripper device from a generally vertical position to a generally horizontal position, wherein the moved sheet includes a generally upright arcuate cross sectional configuration.

3. The method according to claim 2 wherein each of the gripper members include an arcuate cross sectional configuration, and wherein step (a) includes contacting the flexible sheet with each of the gripper members.

4. The method according to claim 3 wherein the gripper members include a first gripper member and a second opposed gripper member, wherein an outer arcuate bounding surface of the first gripper member is able to be moved relative toward engagement with an inner arcuate bounding surface of the second gripper member, and wherein step (a) includes relatively moving the first gripper member toward the second gripper member.

5. The method according to claim 4 wherein the gripper members comprise a pair of rotatable gripper fingers, wherein the first gripper member comprises a gripper finger, and wherein the second gripper member comprises a gripper finger, and wherein step (a) includes gripping the flexible sheet with the pair of rotatable gripper fingers.

6. The method according to claim 5 and further comprising a robotic sheet handling device, wherein the robotic sheet handling device comprises the rotatable gripper fingers, and wherein step (b) includes operating the robotic sheet handling device to move the sheet.

7. The method according to claim 6 wherein the automated banking machine includes an enclosure, and wherein the robotic sheet handling device is positioned in the enclosure, and wherein step (a) includes gripping the sheet in the enclosure.

8. The method according to claim 7 and further comprising a printer, wherein the sheet comprises a printed sheet, and wherein step (a) includes gripping the printed sheet adjacent the printer.

9. The method according to claim 7 wherein the automated banking machine comprises an automated teller machine (ATM), wherein the ATM includes a currency dispenser within the enclosure, and further comprising operating the currency dispenser to dispense currency.

10. A method including:
   (a) gripping a flexible sheet with a gripper device in an automated banking machine apparatus, wherein the gripping produces a generally arcuate cross sectional configuration in at least a portion of the gripped sheet,
   (b) moving the gripped sheet and the gripper device from a generally vertical position to a generally horizontal position, wherein the moved sheet includes a generally upright arcuate cross sectional configuration,
   (c) prior to (b), moving the gripped sheet and the gripper device to a generally vertical position.

11. The method according to claim 10 and prior to step (b), further comprising
   (d) subsequent to (c), rotating the gripped sheet and the gripper device.

12. The method according to claim 11 wherein step (a) is prior to steps (b) and (c) and (d), and wherein step (a) includes gripping the sheet in a generally horizontal position.

13. The method according to claim 12 wherein step (a) includes producing a generally downward contour configuration in at least a portion of the gripped sheet.

14. The method according to claim 13 wherein in step (b) includes imparting rigidity to the sheet.

15. A method including:
   (a) gripping a flexible sheet in a generally horizontal position with a gripper device in an automated banking machine, wherein the gripping produces a generally downward arcuate cross sectional configuration in at least a portion of the gripped sheet, wherein the gripper device includes gripper members, wherein an outer arcuate bounding surface of a first gripper member is able to be moved relative toward engagement with an inner arcuate housing surface of a second gripper member,
   (b) subsequent to (a), moving the gripped sheet and the gripper device to a generally vertical position,
   (c) subsequent to (b), rotating the gripped sheet and the gripper device,
   (d) subsequent to (c), moving the gripped sheet and the gripper device from the generally vertical position to a generally horizontal position, wherein the moved sheet includes a generally upright arcuate cross sectional configuration.

16. The method according to claim 15 wherein in step (d) includes imparting rigidity to the sheet.

17. The method according to claim 15 and further comprising a robotic sheet handling device, wherein the robotic sheet handling device comprises the gripper device, wherein the gripper device comprises a pair of rotatable gripper fingers, and wherein step (a) includes gripping the sheet with the pair of rotatable gripper fingers.

18. The method according to claim 17 wherein the automated banking machine comprises a printer, wherein the sheet comprises a printed sheet, and wherein step (a) includes gripping the printed sheet adjacent the printer.

19. The method according to claim 17 wherein the automated banking machine comprises an automated teller machine (ATM) and an enclosure, wherein the ATM includes a currency dispenser, wherein the robotic sheet handling device and the currency dispenser are both positioned within the enclosure, and further comprising operating the currency dispenser to dispense currency.

20. The method according to claim 17 comprising operating the robotic sheet handling device in performing steps (a) and (b) and (c) and (d).

* * * * *